(12) United States Patent
Mori et al.

(10) Patent No.: US 10,352,077 B2
(45) Date of Patent: Jul. 16, 2019

(54) LID OPENING AND CLOSING MECHANISM, ELECTRONIC DEVICE

(71) Applicant: Panasonic Intellectual Property Management Co., Ltd., Osaka-shi, Osaka (JP)

(72) Inventors: Takeshi Mori, Osaka (JP); Kenichi Shindo, Osaka (JP)

(73) Assignee: Panansonic Intellectual Property Management Co., Ltd., Osaka (JP)

( * ) Notice: Subject to any disclaimer, the term of this patent is extended or adjusted under 35 U.S.C. 154(b) by 198 days.

(21) Appl. No.: 15/628,298

(22) Filed: Jun. 20, 2017

(65) Prior Publication Data

US 2017/0283138 A1    Oct. 5, 2017

Related U.S. Application Data

(63) Continuation of application No. PCT/JP2015/006192, filed on Dec. 11, 2015.

(30) Foreign Application Priority Data

Dec. 26, 2014    (JP) ................................ 2014-265961

(51) Int. Cl.
| | |
|---|---|
| *E05F 1/00* | (2006.01) |
| *G06F 1/16* | (2006.01) |
| *E05F 15/638* | (2015.01) |
| *B65D 51/24* | (2006.01) |
| *H01M 2/10* | (2006.01) |

(52) U.S. Cl.
CPC .............. *E05F 1/00* (2013.01); *B65D 51/243* (2013.01); *E05F 15/638* (2015.01); *G06F 1/1626* (2013.01); *G06F 1/1656* (2013.01); *G06F 1/1679* (2013.01); *H01M 2/1022* (2013.01); *E05Y 2900/00* (2013.01); *E05Y 2900/606* (2013.01)

(58) Field of Classification Search
CPC .... G06F 1/1679; B65D 51/243; E05F 15/646; E05F 15/638; E05F 1/00
See application file for complete search history.

(56) References Cited

U.S. PATENT DOCUMENTS

| | | | | |
|---|---|---|---|---|
| 3,160,431 A | * | 12/1964 | Anderson ................ | A47K 5/02 292/42 |
| 4,740,020 A | * | 4/1988 | Williams ................ | E05B 37/20 24/634 |

(Continued)

FOREIGN PATENT DOCUMENTS

JP    2012-186069    9/2012

*Primary Examiner* — Justin B Rephann
(74) *Attorney, Agent, or Firm* — Hamre, Schumann, Mueller & Larson, P.C.

(57) ABSTRACT

The lid opening and closing mechanism in the present disclosure has an operating member which is displaceable relative to a housing body, and a drive mechanism. When the operating member is in a first position relative to the housing body, the drive mechanism locks the lid so that the lid does not move in a predetermined direction, and when the operating member is moved to a second position relative to the housing body, the drive mechanism releases the lock on the lid, moves the lid in the predetermined direction by at least a predetermined distance, and separates the lid from a predetermined face in a direction perpendicular to the predetermined face.

5 Claims, 22 Drawing Sheets

(56) References Cited

U.S. PATENT DOCUMENTS

| | | | | |
|---|---|---|---|---|
| 6,430,877 | B1* | 8/2002 | Rosenquist | E05C 9/042 |
| | | | | 49/395 |
| 9,756,157 | B2* | 9/2017 | Iwamoto | H01R 13/5219 |
| 2001/0052240 | A1* | 12/2001 | Kim | F24F 1/0011 |
| | | | | 62/409 |
| 2009/0219676 | A1* | 9/2009 | Murakata | H05K 5/0086 |
| | | | | 361/679.01 |
| 2010/0212228 | A1* | 8/2010 | Chang | E05B 65/006 |
| | | | | 49/346 |
| 2011/0072725 | A1* | 3/2011 | Cheng | G06F 1/1679 |
| | | | | 49/279 |
| 2011/0211300 | A1* | 9/2011 | Mori | G06F 1/1656 |
| | | | | 361/679.01 |
| 2013/0044420 | A1* | 2/2013 | Iwamoto | H01R 13/447 |
| | | | | 361/679.01 |
| 2014/0000168 | A1* | 1/2014 | Uehara | E06B 3/5054 |
| | | | | 49/149 |
| 2014/0026488 | A1* | 1/2014 | Andersson | E05D 15/1065 |
| | | | | 49/210 |
| 2015/0062794 | A1* | 3/2015 | Hirai | G06F 1/1679 |
| | | | | 361/679.27 |

* cited by examiner

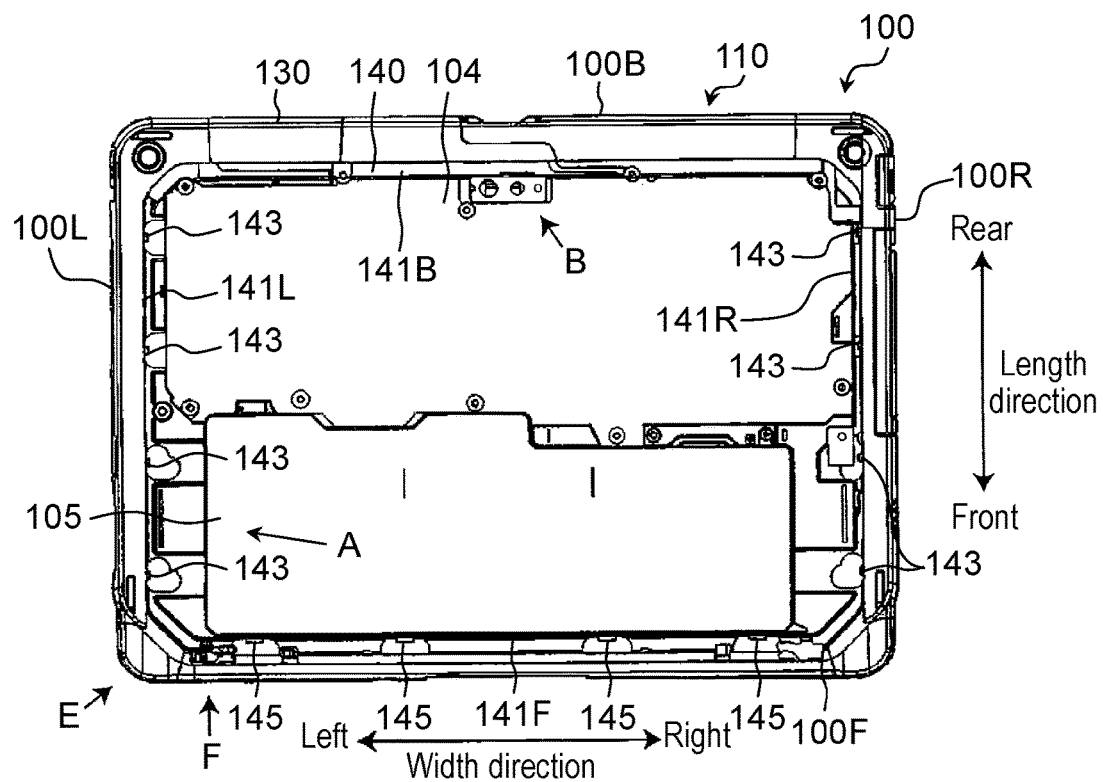
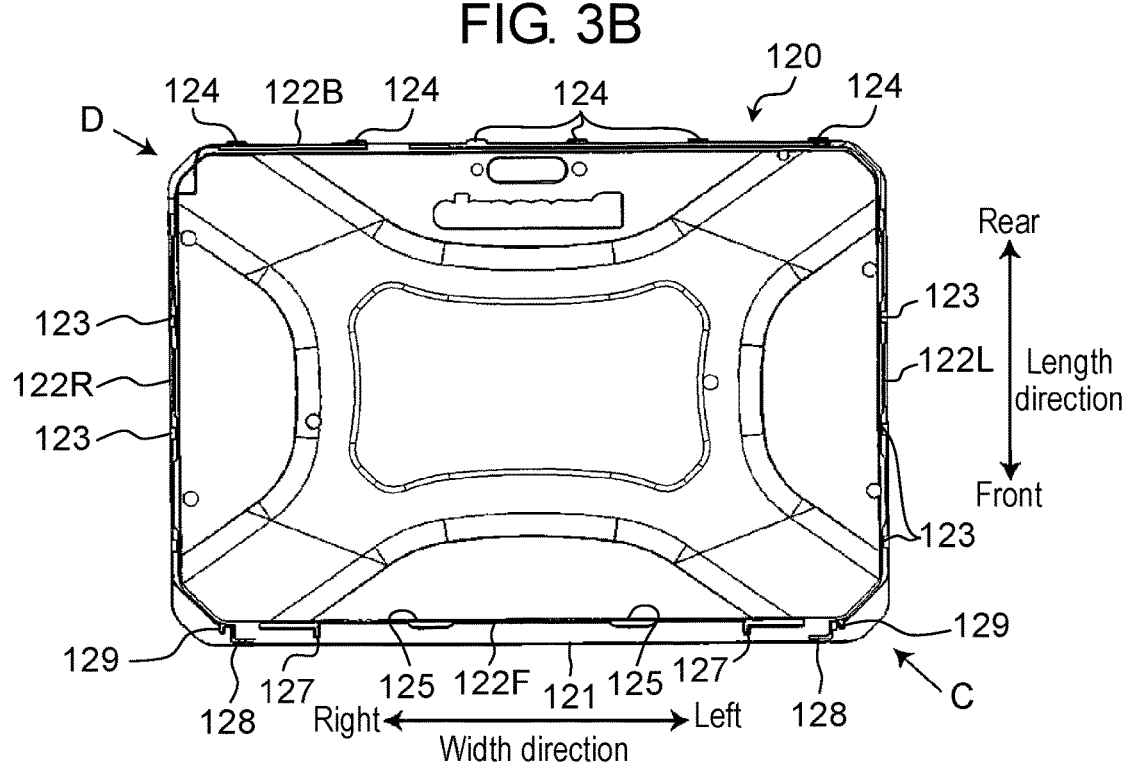

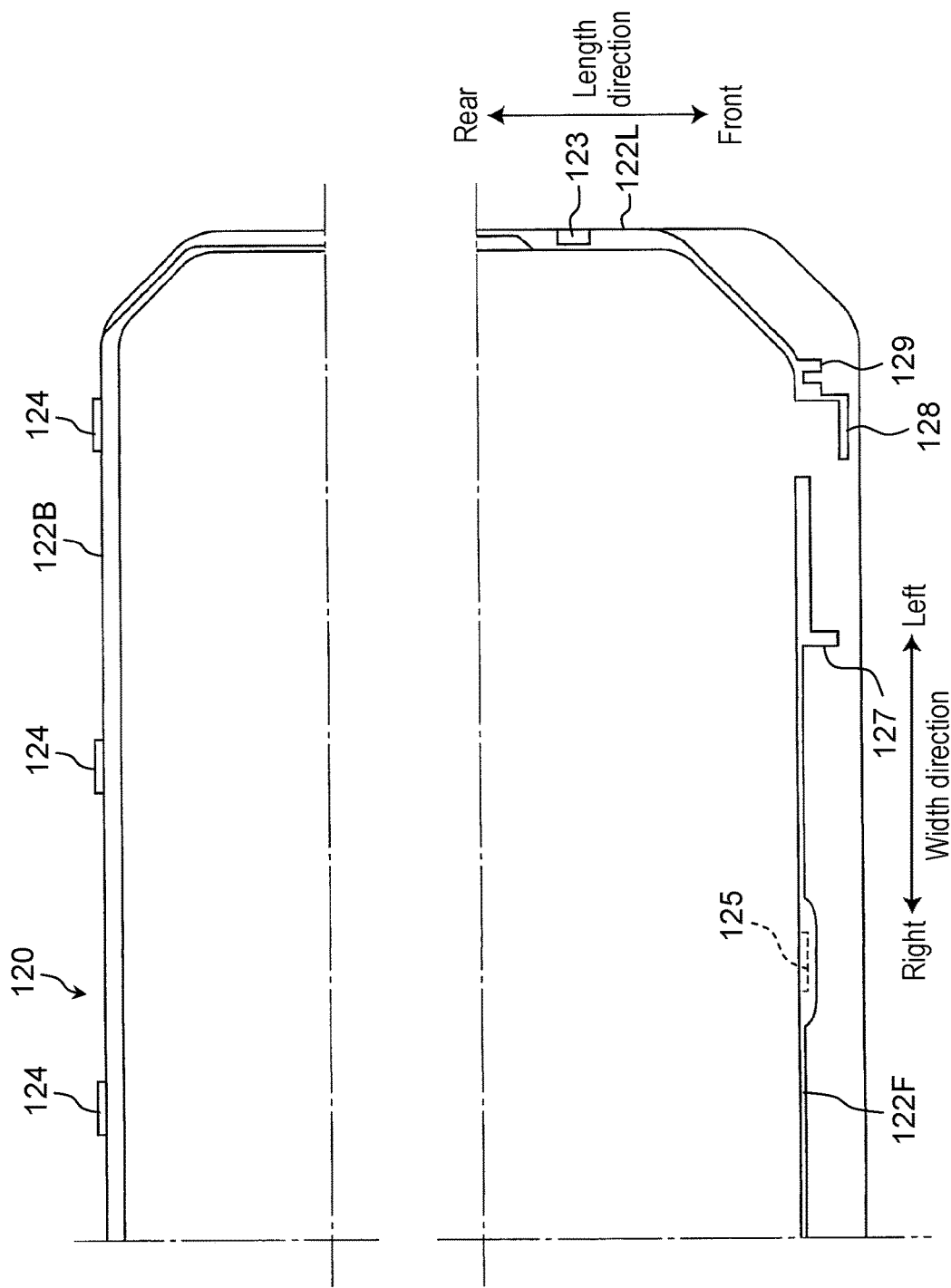

LID OPENING AND CLOSING MECHANISM, ELECTRONIC DEVICE

BACKGROUND

1. Technical Field

The present disclosure relates to a lid opening and closing mechanism for an electronic device which includes a housing body constituting sections other than a predetermined face of a housing for accommodating electronic components, and a lid which constitutes a section corresponding to the predetermined face of the housing and is detachable to the housing body, the lid being engaged with the housing body in a state of being attached to the housing body.

2. Description of Related Art

Unexamined Japanese Patent Publication No. 2012-186069 discloses an electronic device which has a housing body constituting sections other than a predetermined face of a housing for accommodating electronic components, and a lid which constitutes the section corresponding to the predetermined face of the housing and is detachable to the housing body. In the electronic device, the lid is configured such that a predetermined side of the lid is engaged with the housing body in a state in which the lid is attached to the housing body.

SUMMARY

A lid opening and closing mechanism according to a first aspect of the present disclosure is a lid opening and closing mechanism for an electronic device which includes a housing body constituting sections other than a predetermined face of a housing for accommodating electronic components, and a lid which constitutes a section corresponding to the predetermined face of the housing and is detachable to the housing body.

The lid is configured to be engaged with the housing body in a state of being attached to the housing body, and to release the engagement with the housing body when being moved in a predetermined direction parallel to the predetermined face from the state of being attached to the housing body.

The opening and closing mechanism has an operating member which is disposed on the housing body so as to be displaceable relative to the housing body, and a drive mechanism.

The drive mechanism locks the lid so that the lid does not move in the predetermined direction when the operating member is in a first position relative to the housing body with the lid being attached to the housing body.

When the operating member is moved to a second position relative to the housing body with the lid being attached to the housing body, the drive mechanism releases the lock on the lid, moves the lid in the predetermined direction by at least a predetermined distance, and separates the lid from the predetermined face in a direction perpendicular to the predetermined face.

According to the lid opening and closing mechanism and the electronic device in the present disclosure, usability in opening and closing the lid can be enhanced.

BRIEF DESCRIPTION OF DRAWINGS

FIG. 3A is a back view of the electronic device, according to the first exemplary embodiment, from which the lid is removed.

FIG. 3B is a view of a lower surface of the lid of the electronic device according to the first exemplary embodiment.

FIG. 7 is an enlarged view of a rear part and a front part of lid 120 illustrated in FIG. 3B.

DETAILED DESCRIPTION

Exemplary embodiments will be described below in detail with reference to the drawings appropriately. However, detailed descriptions more than necessary might sometimes be omitted. For example, detailed descriptions of already known items and duplicated descriptions of substantially identical configurations might sometimes be omitted. Such omissions are for preventing following description from becoming redundant more than necessary, and for helping those skilled in the art easily understand the following description.

Note that the attached drawings and the following description are provided for those skilled in the art to fully understand the present disclosure, and are not intended to limit the subject matter as described in the appended claims.

First Exemplary Embodiment

A first exemplary embodiment will be described below with reference to the drawings.

[1. Configuration]

[1-1. Outline of Electronic Device]

Figure 1:
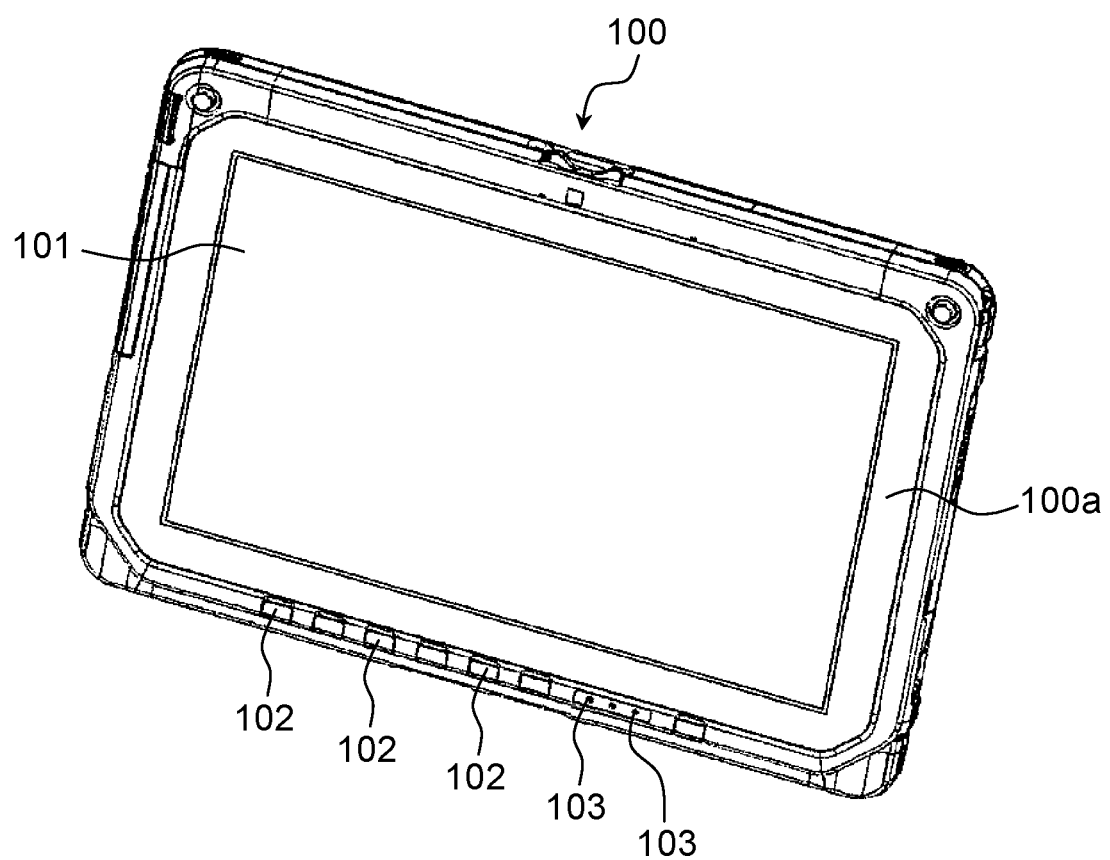
FIG. 1 is a front perspective view of an electronic device according to a first exemplary embodiment.

FIG. 1 is a front perspective view of the electronic device according to the present exemplary embodiment.

As illustrated in FIG. 1, electronic device 100 is a tablet computer. Electronic device 100 has display 101, operation switch 102, and indicator 103 on first main face 100a. Display 101 is, for example, a liquid crystal display panel. Display 101 is also a touch panel capable of accepting a touch operation performed by a user. Operation switch 102 is a hardware switch capable of accepting a depression operation performed by the user. Indicator 103 is a display device capable of displaying an operating state or the like of electronic device 100. Indicator 103 is configured of a light-emitting diode, for example. Electronic device 100 is incorporated with a processing unit such as a central processing unit (CPU), storage devices (recording devices) such as a random access memory (RAM), a read only memory (ROM), and a solid state disk (SSD), a battery, and the like. The ROM and SSD are stored with, for example, an operating system (OS), various application programs, and various data. The CPU reads the OS, the application programs, and the various data, and executes arithmetic processing to achieve various functions according to a content of an operation performed by the user.

[1-2. Structure of Housing, Etc. of Electronic Device]

Figure 2A:
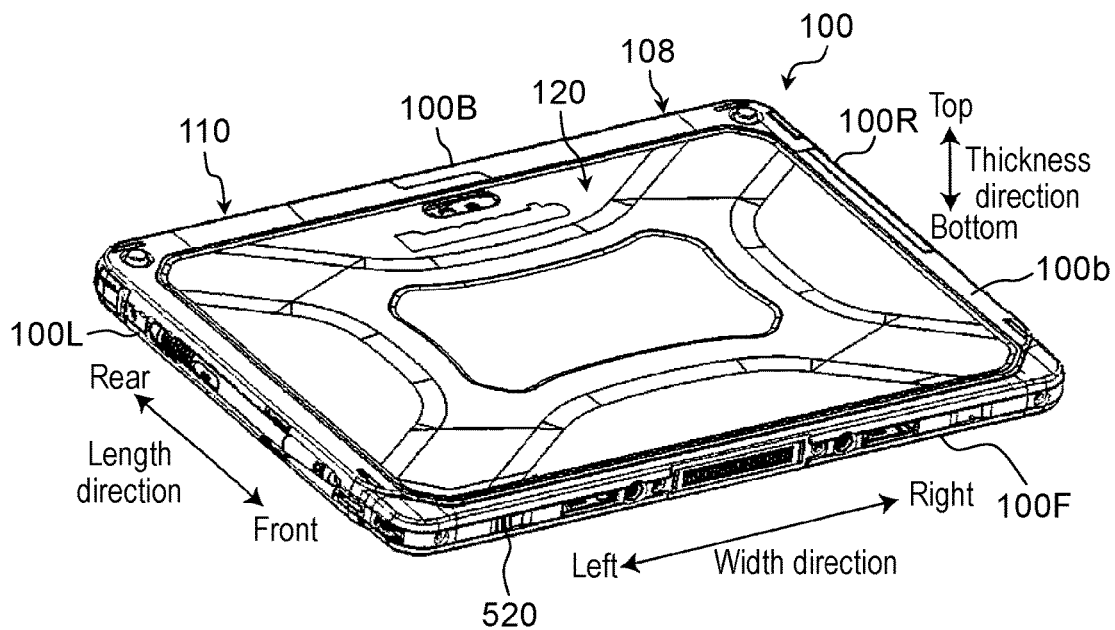
FIG. 2A is a back perspective view of the electronic device according to the first exemplary embodiment.

FIG. 2A is a back perspective view of electronic device 100 according to the first exemplary embodiment. In the present exemplary embodiment, a direction perpendicular to first main face 100a and second main face 100b (see FIG. 2A) parallel to first main face 100a of electronic device 100 is defined as a thickness direction of the electronic device. In addition, in a direction orthogonal to the thickness direction, a direction parallel to long sides 100F and 100B of electronic device 100 is defined as a width direction of electronic device 100, and a direction parallel to short sides 100L and 100R is defined as a length direction of electronic device 100. For ease of description and comprehension, the following description will be made with second main face 100b side being defined as a top side and first main face 100a side being defined as a bottom side in the thickness direction. In addition, in the length direction, a direction toward one side 100F having operating member 520 provided thereon is defined as a frontward direction (front), and a direction toward other side 100B is defined as a rearward direction (rear). Further, in the width direction, a direction toward side 100L out of short sides 100L and 100R is defined as left, and a direction toward side 100R is defined as right.

As illustrated in FIG. 2A, electronic device 100 has housing 108 that accommodates various electronic components described above. Housing 108 has housing body 110 and lid 120. Lid 120 is provided on second main face 100b which is on the back of first main face 100a of electronic device 100. Housing body 110 constitutes sections other than a predetermined face of housing 108. The predetermined face is a section on second main face 100b within a predetermined range, and substantially a section other than later-described side cover 130 of housing 108. Lid 120 constitutes the section corresponding to the predetermined face of housing 108.

Figure 2B:
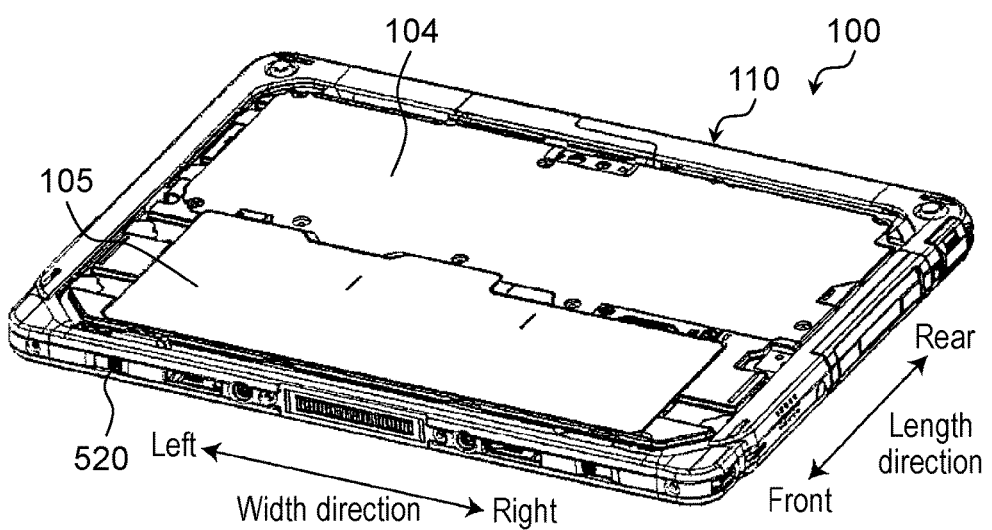
FIG. 2B is a back perspective view of the electronic device, according to the first exemplary embodiment, from which a lid is removed.

FIG. 2B is a perspective view of electronic device 100, according to the first exemplary embodiment, from which lid 120 is removed.

A circuit board having mounted thereon various electronic components and battery 105 are accommodated inside housing body 110. The circuit board is disposed below inner lid 104 (configurable lid). Inner lid 104 is detachable by using a special tool in a user support center, etc. Lid 120 has a size slightly smaller than first main face 100a of electronic device 100. Therefore, battery 105 and circuit board slightly smaller than electronic device 100, that is, battery 105 and circuit board which are relatively large can be accommodated. Further, lid 120 can easily be removed as described later. Thus, a user can replace battery 105 when battery 105 is deteriorated and the like. In addition, changing settings of electronic device 100, attachment of extension device, inspection of electronic device 100, maintenance service, etc. are enabled by removing inner lid 104 at a user support center or the like.

[1-2-1. Structure of Housing Body]

FIG. 3A is a back view of electronic device 100, according to the first exemplary embodiment, from which lid 120 is removed.

Housing body 110 includes frame 140 made of metal, and side cover 130 made of resin. Frame 140 is a member configuring a framework and a part of an exterior of electronic device 100. Frame 140 is formed of, for example, metal such as a magnesium alloy or resin. Side cover 130 is a frame-shaped member configuring exteriors of sides (rear side 100B, front side 100F, left side 100L, and right side 100R) of electronic device 100. Side cover 130 is formed of, for example, resin.

Frame 140 is formed into substantially a rectangular shape in a plan view. Upper surface 146 (surface on which lid 120 is attached, see FIG. 9) of frame 140 is provided with front longitudinal surface 141F, rear longitudinal surface 141B, left longitudinal surface 141L, and right longitudinal surface 141R, which perpendicularly erect from upper surface 146. Front longitudinal surface 141F, rear longitudinal surface 141B, left longitudinal surface 141L, and right longitudinal surface 141R respectively extend substantially parallel to and near rear side 100B, front side 100F, left side 100L, and right side 100R of electronic device 100.

Front longitudinal surface 141F is formed with a plurality of front protrusions 145. Front protrusions 145 protrude forward from front longitudinal surface 141F (see FIG. 9). Note that front longitudinal surface 141F may be formed with only one front protrusion 145.

Figure 4:
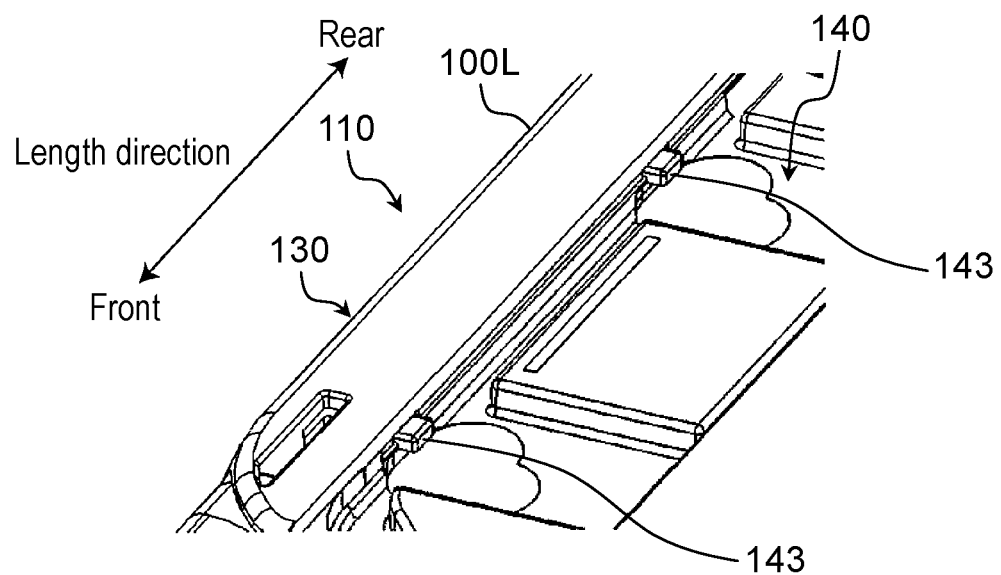
FIG. 4 is a view as viewed from a direction of arrow A in FIG. 3A.

Left longitudinal surface 141L and right longitudinal surface 141R are respectively formed with a plurality of side protrusions 143. As also illustrated in FIG. 4 (view as viewed from a direction of arrow A in FIG. 3A), protrusions 143 on left longitudinal surface 141L protrude rightward from left longitudinal surface 141L. Protrusions 143 on right longitudinal surface 141R protrude leftward from right longitudinal surface 141R. Note that each of left longitudinal surface 141L and right longitudinal surface 141R may be formed with only one side protrusion 143.

Figure 5:
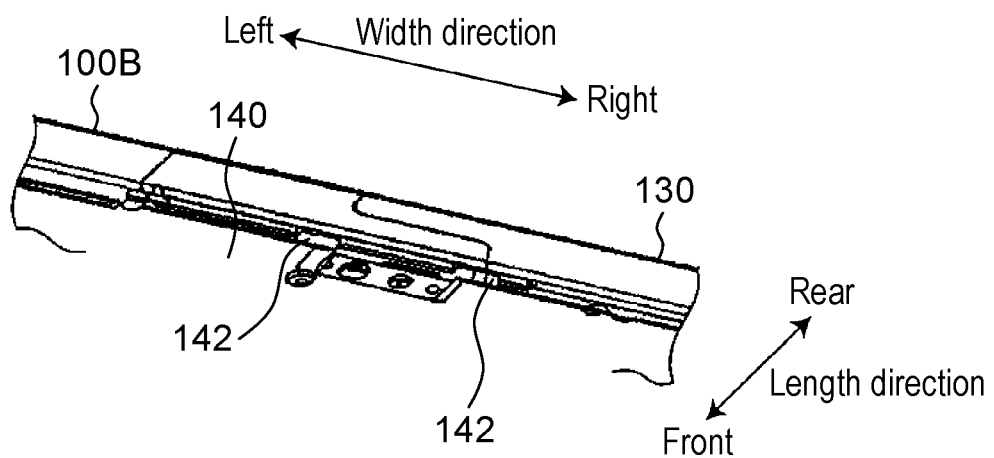
FIG. 5 is a view as viewed from a direction of arrow B in FIG. 3A.

Rear longitudinal surface 141B is formed with a plurality of rear recesses 142. As also illustrated in FIG. 5 (view as viewed from a direction of arrow B in FIG. 3A), rear recesses 142 penetrate through rear longitudinal surface 141B in a front-rear direction (see FIG. 9). Note that rear longitudinal surface 141B may be formed with only one rear recess 142.

[1-2-2. Structure of Lid]

FIG. 3B is a view of a lower surface of lid 120 of electronic device 100 according to the first exemplary embodiment.

As illustrated in FIG. 3B, lid 120 is formed into substantially a rectangular shape in a plan view. Lid 120 has a size substantially equal to an interior region of substantially rectangular frame-shaped side cover 130 of housing body 110.

Figure 6A:
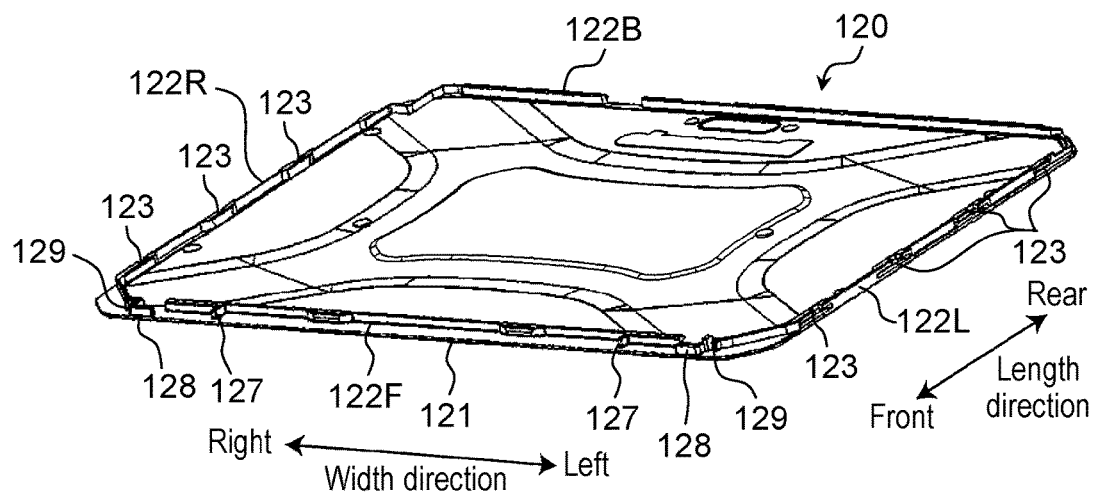
FIG. 6A is a view as viewed from a direction of arrow C in FIG. 3B.
Figure 6B:
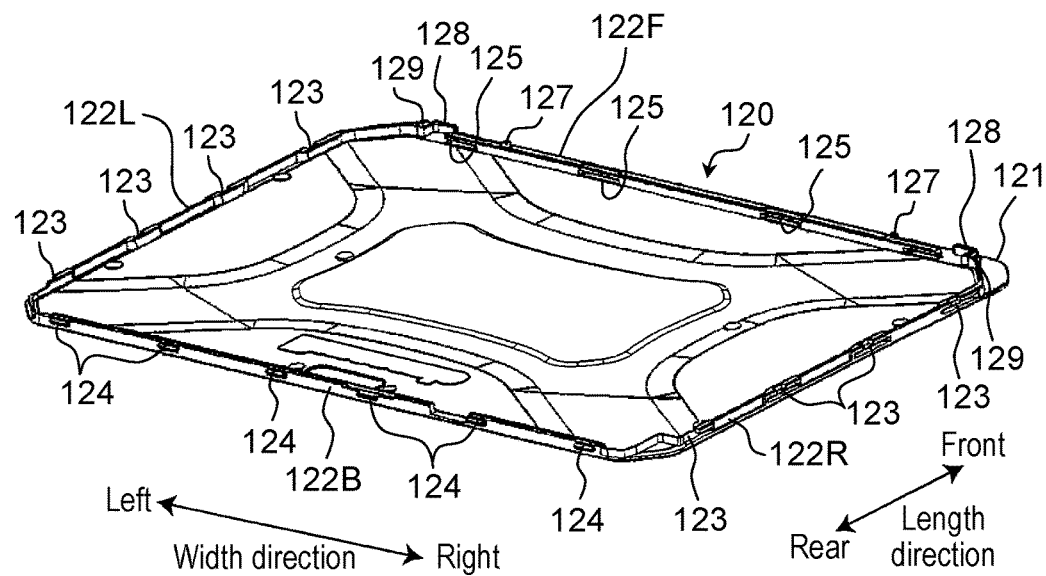
FIG. 6B is a view as viewed from a direction of arrow D in FIG. 3B.

FIG. 6A is a view as viewed from a direction of arrow C in FIG. 3B. FIG. 6B is a view as viewed from a direction of arrow D in FIG. 3B. FIG. 7 is an enlarged view of a rear part and a front part of lid 120 illustrated in FIG. 3B.

As illustrated in FIGS. 3B, 6A, 6B, and 7, a lower surface of flat surface section 121 of lid 120 is formed with front longitudinal surface 122F, rear longitudinal surface 122B, left longitudinal surface 122L, and right longitudinal surface 122R, which perpendicularly rise from the lower surface. Front longitudinal surface 122F, rear longitudinal surface 122B, left longitudinal surface 122L, and right longitudinal surface 122R respectively extend substantially parallel to upper, lower, left, and right sides of lid 120.

Front longitudinal surface 122F is formed with a plurality of front recesses 125. Front recesses 125 are recessed frontward on the rear surface of front longitudinal surface 122F. Note that front longitudinal surface 122F may be formed with only one front recess 125.

Left longitudinal surface 122L and right longitudinal surface 122R are respectively provided with a plurality of side recesses 123. Side recesses 123 on left longitudinal surface 122L are recessed rightward on left longitudinal surface 122L. Side recesses 123 on right longitudinal surface 122R are recessed leftward on right longitudinal surface 122R. Note that each of left longitudinal surface 122L and right longitudinal surface 122R may be formed with only one side recess 123.

Rear longitudinal surface 122B is formed with a plurality of rear protrusions 124. Rear protrusions 124 protrude rearward from the rear surface of rear longitudinal surface 122B. Note that rear longitudinal surface 122B may be formed with only one rear protrusion 124.

Front protrusions 145 on frame 140 of housing body 110 and front recesses 125 on lid 120, rear recesses 142 on housing body 110 and rear protrusions 124 on lid 120, and side protrusions 143 on housing body 110 and side recesses 123 on lid 120 are disposed in a predetermined positional relationship, respectively. The predetermined positional relationship indicates that, in a state where lid 120 is attached to housing body 110 (in a state where lid 120 and housing body 110 are in a predetermined attachment position), they are engaged with each other, and the engagement between lid 120 and housing body 110 is released when lid 120 is moved by a predetermined distance in a direction parallel to the predetermined face of housing body 110 from the predetermined attachment position with lid 120 being attached to housing body 110.

[1-2-3. Configuration of Lid Opening and Closing Mechanism]

Electronic device 100 according to the present exemplary embodiment has an opening and closing mechanism capable of locking lid 120 so that lid 120 does not move in a predetermined direction in a state where lid 120 is attached to housing body 110. The predetermined direction is a direction of movement of lid 120 when lid 120 is removed. The configuration of the opening and closing mechanism will be described below. An engagement releasing direction (predetermined direction) is a frontward direction in the length direction in the present exemplary embodiment.

Figure 8:
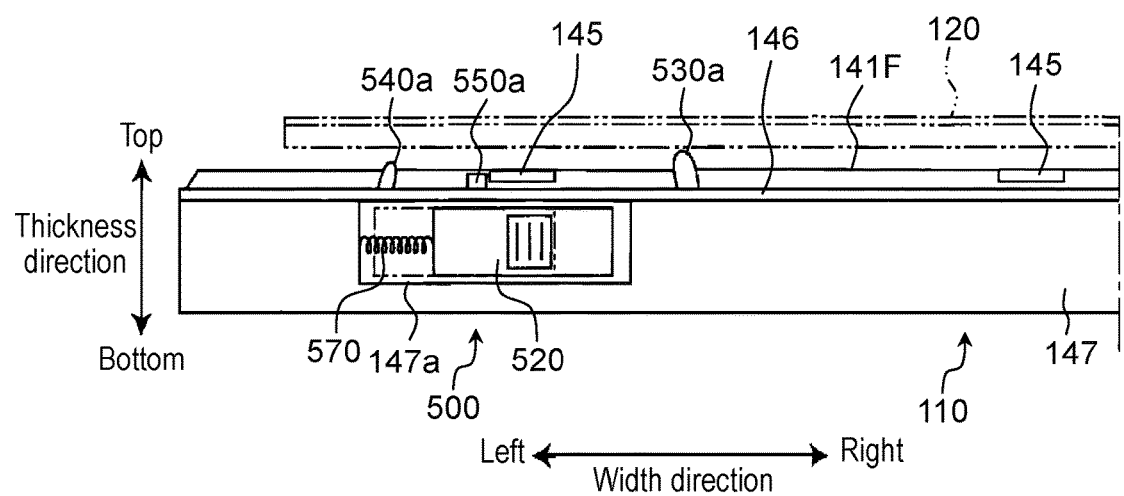
FIG. 8 is a side view (schematic view) of the electronic device on a portion indicated by arrow F in FIG. 3A.

FIG. 8 is a side view (schematic view) of electronic device 100 on a portion indicated by arrow F in FIG. 3A. FIG. 8 illustrates that the lid opening and closing mechanism is in a first state described later. When lid 120 is placed on housing body 110 with the lid opening and closing mechanism being in the first state, lid 120 is separated from the predetermined face of housing body 110 as indicated by a two-dot chain line.

The opening and closing mechanism includes operating member 520 and drive mechanism 500.

Operating member 520 is disposed in opening 147*a* formed on side surface 147 on front side 100F of housing body 110, and is displaceable relative to housing body 110. Specifically, operating member 520 is movable, in opening 147*a*, relative to housing body 110 of electronic device 100 between a first position indicated by a solid line and a second position indicated by a two-dot chain line in the width direction (longer direction of front side 100F of housing body 110) of electronic device 100.

Drive mechanism 500 is configured to lock lid 120 so that lid 120 does not move in the predetermined direction when operating member 520 is in the first position relative to housing body 110 in a state where lid 120 is attached to housing body 110. Drive mechanism 500 is also configured to release the lock on lid 120, move lid 120 in the predetermined direction by a predetermined distance, and separates lid 120 from the predetermined face in a direction perpendicular to the predetermined face, when operating member 520 is moved to the second position relative to housing body 110 with lid 120 being attached to housing body 110. The configuration of drive mechanism 500 will be specifically described below.

[1-2-3-1. Configuration of Drive Mechanism]
[1-2-3-1-1. Configuration on Housing Body Side]

Figure 9:
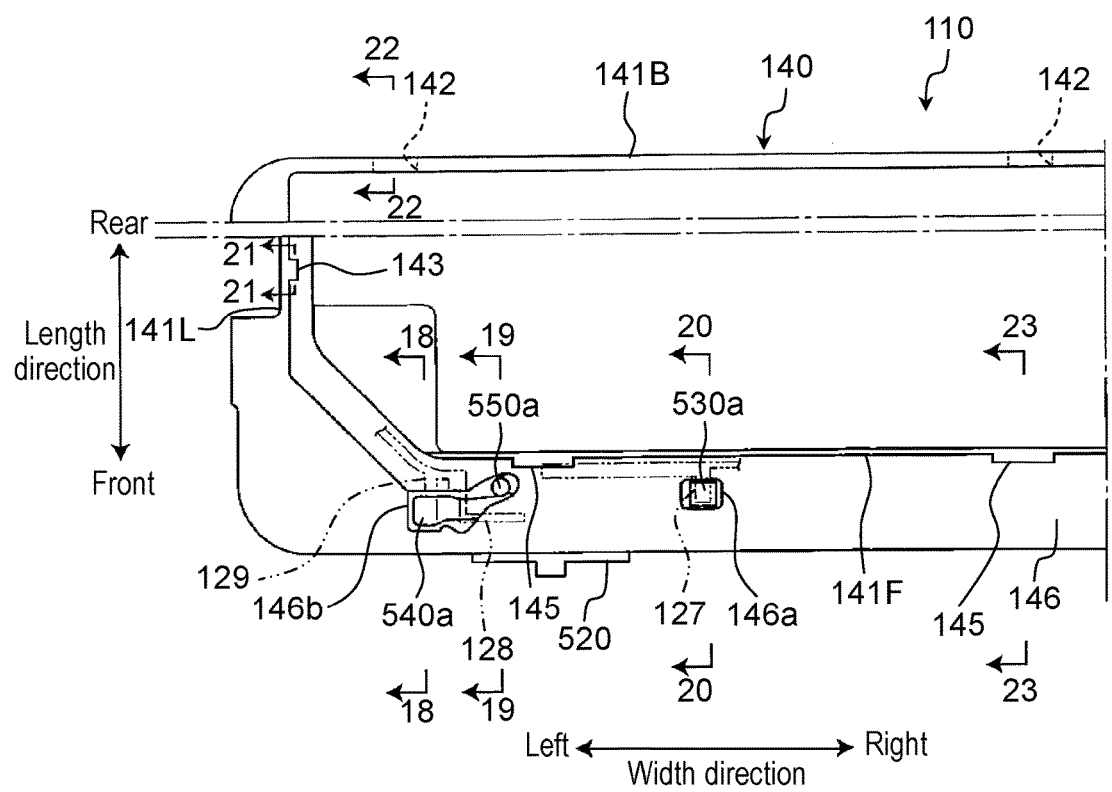
FIG. 9 is an enlarged view of a rear part and a front part of housing body 110 illustrated in FIG. 3A.

FIG. 9 is an enlarged view of a rear part and a front part of housing body 110 illustrated in FIG. 3A.

Second opening 146*a* and first opening 146*b* are formed on upper surface 146 of frame 140 of housing body 110.

Second opening 146*a* is a through-hole penetrating through upper surface 146 of frame 140 in a top-bottom direction. Second opening 146*a* and projection 530*a* of urging member 530 described later are set to have such positional relation and shape that projection 530*a* is movable in second opening 146*a* in substantially the top-bottom direction.

First opening 146*b* is a through-hole penetrating through upper surface 146 of frame 140 in the top-bottom direction. First opening 146*b*, projection 540*a* of lock member 540 described later, and projection 550*a* of movable member 550 described later are set to have such positional relation and shape that projection 540*a* of lock member 540 is movable in first opening 146*b* in substantially the top-bottom direction and projection 550*a* of movable member 550 is movable in first opening 146*b* in substantially the width direction and in substantially the front-rear direction. Note that first opening 146*b* may be divided into an opening for projection 540*a* of lock member 540 and an opening for projection 550*a* for movable member 550.

[1-2-3-1-2. Configuration on Lid Side]

As illustrated in FIGS. 3B, 6A, 6B, and 7 described above, the lower surface of lid 120 is provided with first projection 129, second projection 128, and third projection 127. First projection 129, second projection 128, and third projection 127 respectively rise perpendicularly from the lower surface of lid 120.

First projection 129 is a wall extending forward from a first predetermined position in the longer direction (width direction of lid 120) of front longitudinal surface 122F. First projection 129 and projection 540*a* of lock member 540 described later are set to have such positional relation and shape that projection 540*a* of lock member 540 is located on a position adjacent to the front of first projection 129 with lid 120 being attached, as illustrated in FIG. 9 described above and FIG. 17A.

Second projection 128 is a wall formed anterior to front longitudinal surface 122F so as to be parallel to the longer direction (width direction of lid 120) of front longitudinal surface 122F within a predetermined region in the longer direction (width direction of lid 120). Second projection 128 and projection 550*a* of movable member 550 described later are set to have such positional relation and shape that second projection 128 is located on a predetermined position anterior to projection 550*a* of movable member 550 with lid 120 being attached, as illustrated in FIG. 9 described above and FIG. 17A.

Third projection 127 is a wall extending forward from a second predetermined position in the longer direction (width direction of lid 120) of front longitudinal surface 122F. Third projection 127 and projection 530*a* of urging member 530 described later are set to have such positional relation and shape that third projection 127 is in contact with the top of projection 530*a* of urging member 530 with lid 120 being attached, as illustrated in FIG. 9 described above and FIG. 17A.

[1-2-3-1-3. Configurations of Lock Member, Movable Member, Urging Member, Etc.]

Figure 10A:
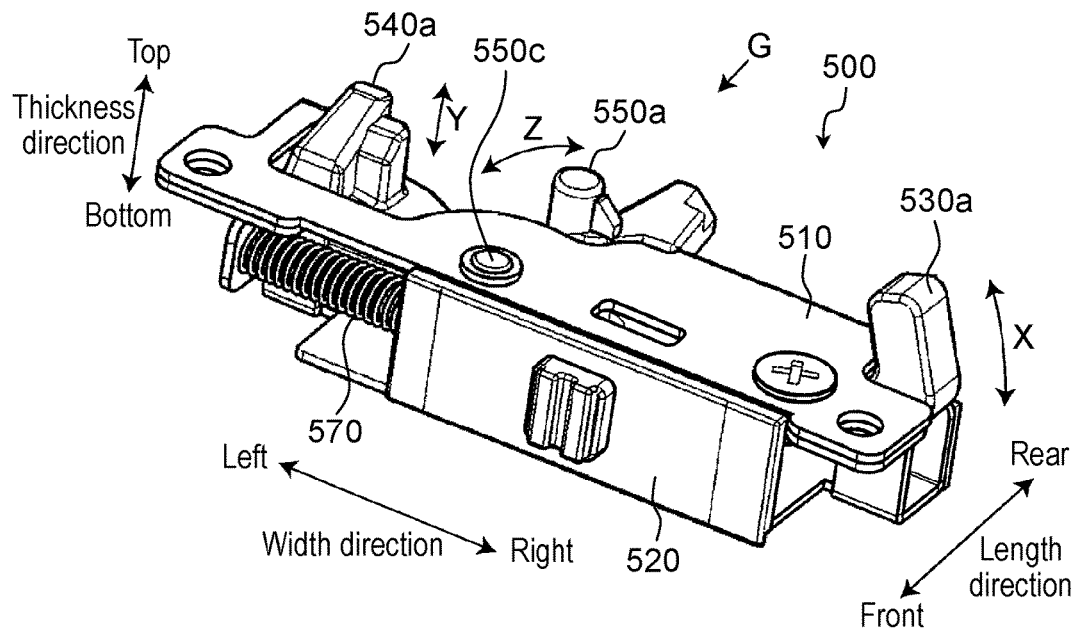
FIG. 10A is a perspective view of configuration parts of the lid opening and closing mechanism on the housing body side.
Figure 10B:
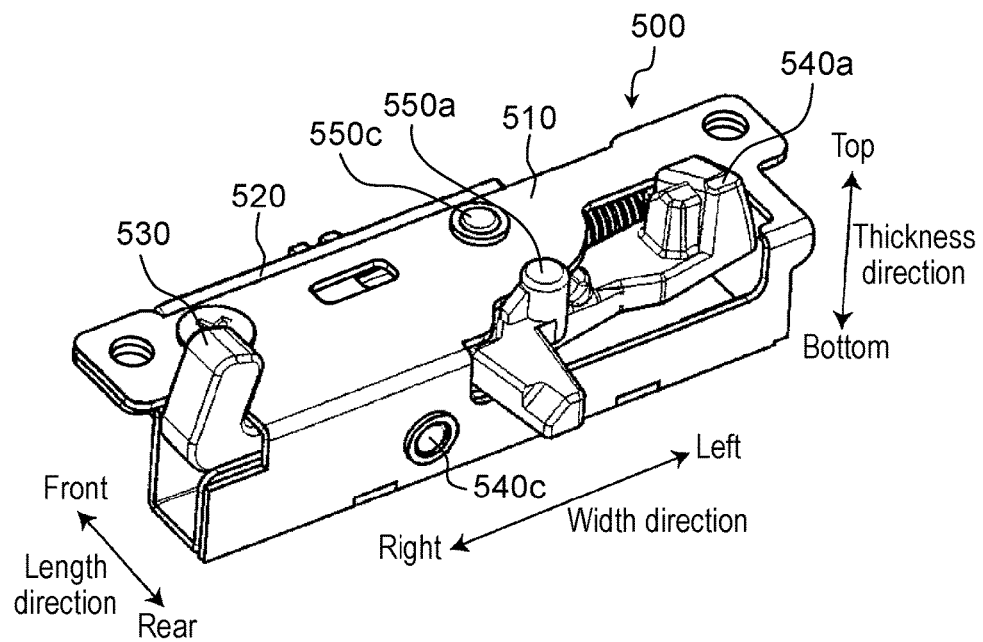
FIG. 10B is a perspective view of configuration parts of the lid opening and closing mechanism on the housing body side as viewed from a direction of arrow G in FIG. 10A.
Figure 11A:
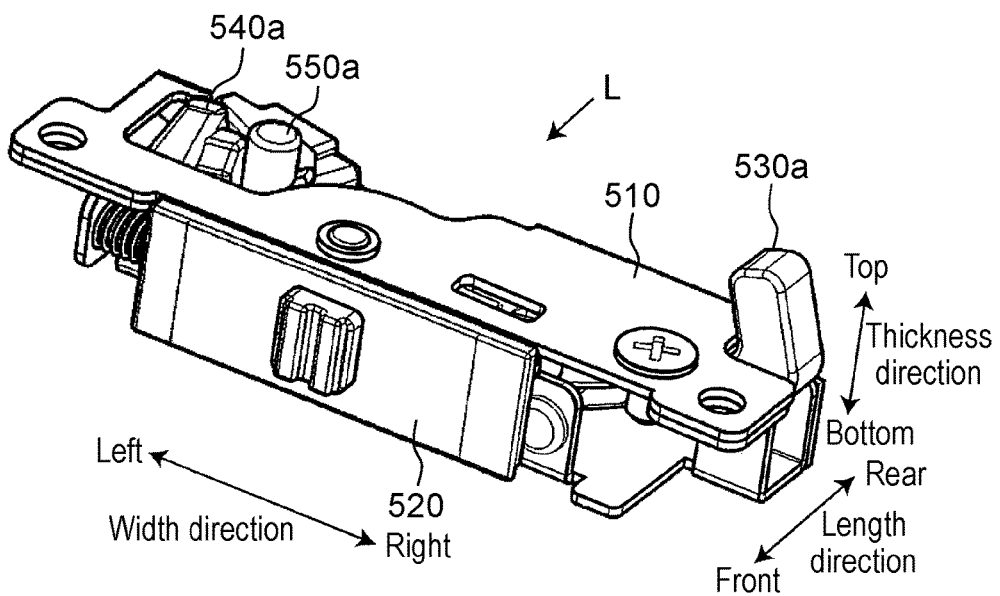
FIG. 11A is a perspective view of configuration parts of the lid opening and closing mechanism on the housing body side.
Figure 11B:
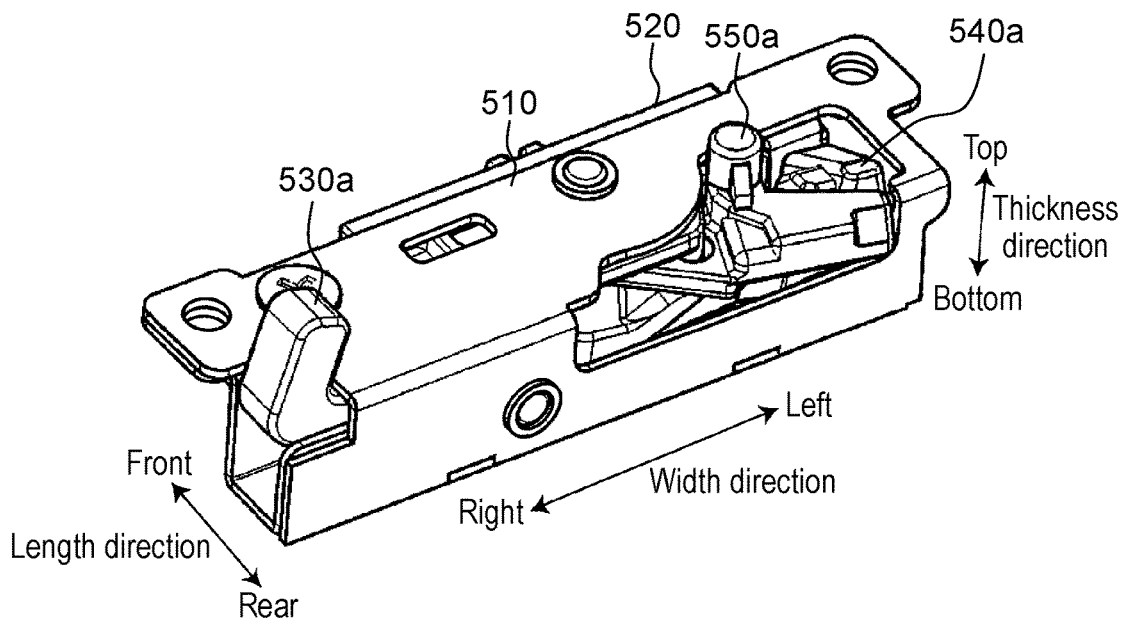
FIG. 11B is a perspective view of configuration parts of the lid opening and closing mechanism on the housing body side as viewed from a direction of arrow L in FIG. 11A.

FIG. 10A is a perspective view of configuration parts of the opening and closing mechanism of lid 120 on housing body 110 side. FIG. 10B is a perspective view of configuration parts of the opening and closing mechanism of lid 120 on housing body 110 side as viewed from a direction of arrow G in FIG. 10A. FIG. 11A is a perspective view of configuration parts of the opening and closing mechanism of lid 120 on housing body 110 side. FIG. 11B is a perspective view of configuration parts of the opening and closing mechanism of lid 120 on housing body 110 side as viewed from a direction of arrow L in FIG. 11A.

As illustrated in FIGS. 10A and 10B, operating member 520 in the opening and closing mechanism in the present exemplary embodiment can be in the first position which is on the right in the width direction of electronic device 100. As illustrated in FIGS. 11A and 11B, operating member 520 can also be in the second position which is on the left in the width direction of electronic device 100. When operating member 520 is moved to the second position from the first position, projection 540*a* described later moves downward, and projection 550*a* moves forward.

Figure 12A:
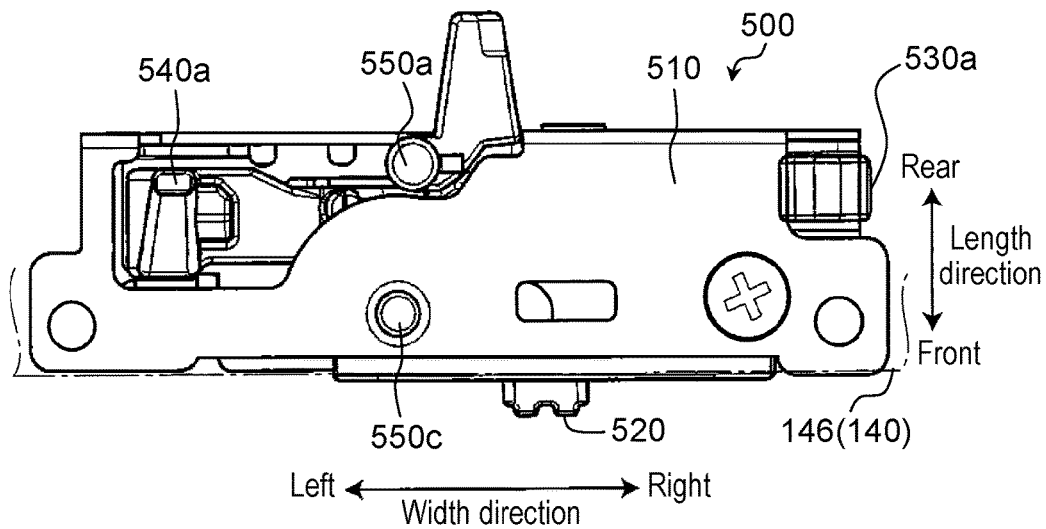
FIG. 12A is a plan view of configuration parts of the lid opening and closing mechanism on the housing body side.
Figure 12B:
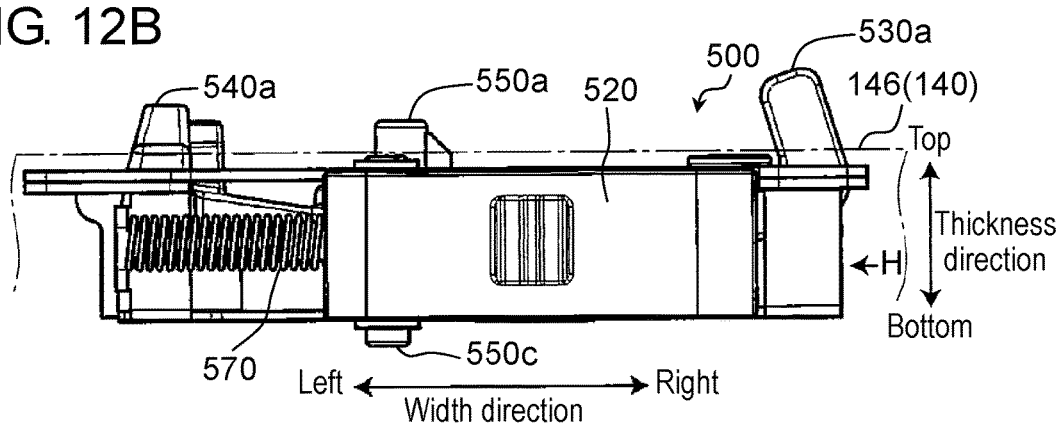
FIG. 12B is a side view of configuration parts of the lid opening and closing mechanism on the housing body side.
Figure 12C:
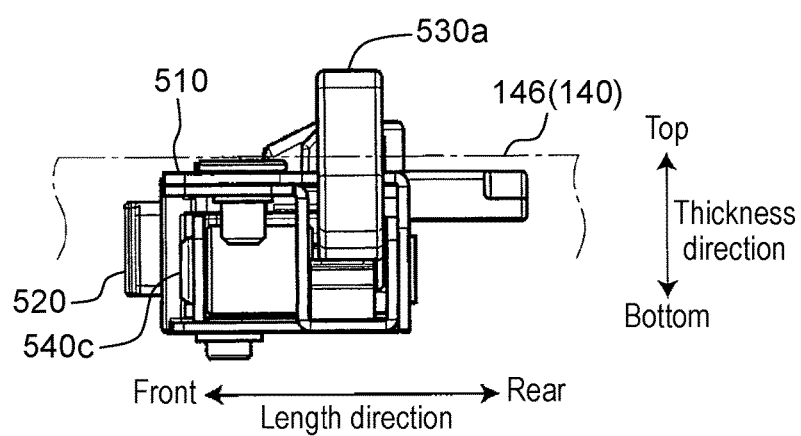
FIG. 12C is an end view of configuration parts of the lid opening and closing mechanism on the housing body side.
Figure 13:
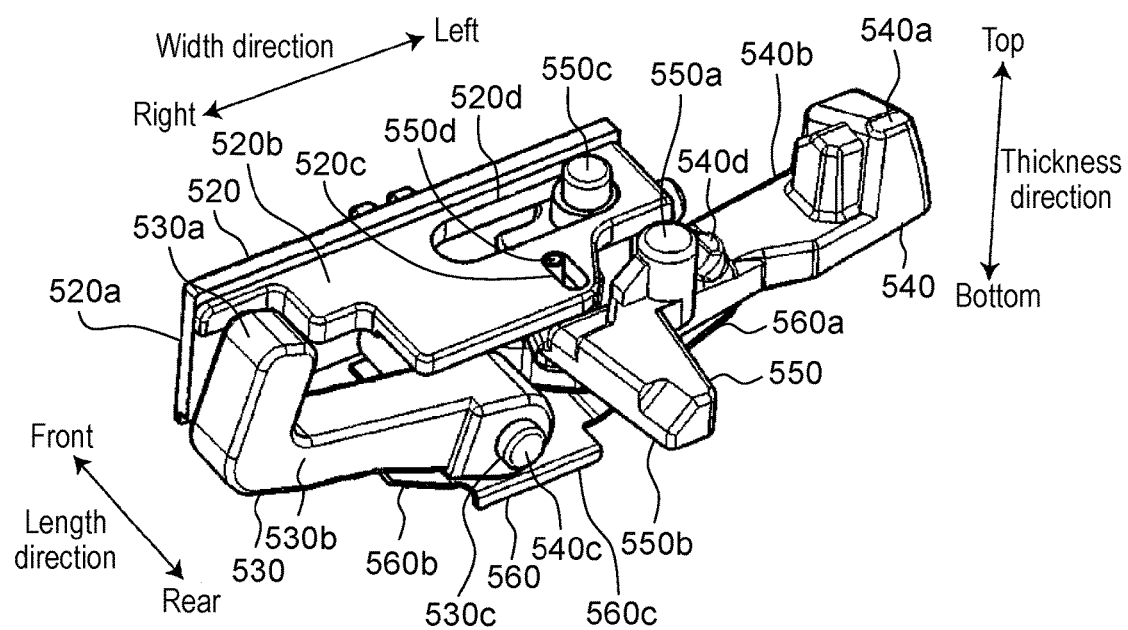
FIG. 13 is a view, as viewed from a direction of arrow G in FIG. 10A, illustrating configuration parts (a case is not illustrated) of the lid opening and closing mechanism in a first state on the housing body side.

FIG. 12A is a plan view of configuration parts of the opening and closing mechanism of lid 120 on housing body 110 side, FIG. 12B is a side view thereof, and FIG. 12C is an end view thereof. FIG. 13 is a view, as viewed from a direction of arrow G in FIG. 10A, illustrating configuration parts (case 510 is not illustrated) of the opening and closing mechanism of lid 120 in the first state on housing body 110 side. The first state indicates a state of the opening and closing mechanism when operating member 520 is in the first position on the right in the width direction of electronic device 100 and lid 120 is not attached.

As illustrated in FIG. 13, drive mechanism 500 includes lock member 540, movable member 550, urging member 530, plate spring 560, and coil spring 570 (see FIG. 12B). Drive mechanism 500 also includes case 510 as illustrated in FIGS. 10A, 10B, 12A, 12B, and 12C. Operating member 520 is supported by case 510 so as to be movable in the width direction of electronic device 100.

Case 510 is accommodated in front side 100F of housing body 110. Case 510 is fixed to frame 140 of housing body 110. While drive mechanism 500 includes case 510 in the present exemplary embodiment, lock member 540, movable member 550, urging member 530, and plate spring 560 may be directly or indirectly supported by frame 140 of housing body 110, and such a configuration does not need case 510.

Lock member 540 is a lever-shaped member. Lock member 540 is disposed such that a longer direction thereof substantially coincides with the width direction of electronic device 100. Lock member 540 has rotation shaft 540c extending in the length direction of electronic device 100 on one end (hereinafter referred to as "base end" as appropriate) of arm 540b extending in the longer direction of lock member 540. As illustrated in FIG. 10B, rotation shaft 540c is supported to be rotatable by case 510. Thus, lock member 540 is rotatable about a rotational shaft center extending in the length direction of electronic device 100. Lock member 540 has, on other end (free end) of arm 540b, projection 540a projecting upward in the thickness direction of electronic device 100. Lock member 540 also has intermediate projection 540d projecting upward in the thickness direction of electronic device 100 on almost an intermediate position in the longer direction of lock member 540.

Urging member 530 is a lever-shaped member. Urging member 530 is disposed such that a longer direction thereof substantially coincides with the width direction of electronic device 100. Urging member 530 has rotation shaft hole 530c penetrating in the length direction of electronic device 100 on one end (hereinafter referred to as "base end" as appropriate) of arm 530b extending in the longer direction of urging member 530. Rotation shaft 540c of lock member 540 is inserted into rotation shaft hole 530c. Thus, urging member 530 is rotatable about a rotational shaft center extending in the length direction of electronic device 100. Urging member 530 has, on other end (free end) of arm 530b, projection 530a projecting upward in the thickness direction of electronic device 100.

Movable member 550 is a lever-shaped member. Movable member 550 has rotation shaft 550c extending in the thickness direction of electronic device 100 on one end of arm 550b extending in the longer direction of movable member 550. As illustrated in FIG. 10B, rotation shaft 550c is supported to be rotatable by case 510. Thus, movable member 550 is rotatable about a rotational shaft center extending in the thickness direction of electronic device 100. Movable member 550 has, on almost an intermediate position of arm 550b, projection 550a projecting upward in the thickness direction of electronic device 100.

Plate spring 560 has substrate 560c, first urging section 560a, and second urging section 560b. Substrate 560c is fixed to case 510 below rotation shaft 540c of lock member 540. First urging section 560a urges lock member 540 so that projection 540a end is lifted upward. Second urging section 560b urges urging member 530 so that projection 530a end is lifted upward.

As illustrated in FIG. 10A described above, coil spring 570 is provided between the left end of case 510 in the width direction of electronic device 100 and left end of operating member 520 in the width direction of electronic device 100 to urge operating member 520 to the right in the width direction of electronic device 100. That is, coil spring 570 urges operating member 520 to be located in the first position.

As illustrated in FIG. 13, operating member 520 has longitudinal surface 520a and lateral surface 520b. Longitudinal surface 520a is disposed almost parallel to side surface 147 of front side 100F of electronic device 100. Lateral surface 520b has first through-hole 520c and second through-hole 520d on an upper surface thereof. First through-hole 520c is an elongated hole extending in the length direction of electronic device 100, and has engaging shaft 550d of movable member 550 engaged therewith. Second through-hole 520d is an elongated hole extending in the longer direction of electronic device 100, and has rotation shaft 550c of movable member 550 fitted thereto.

Figure 14A:
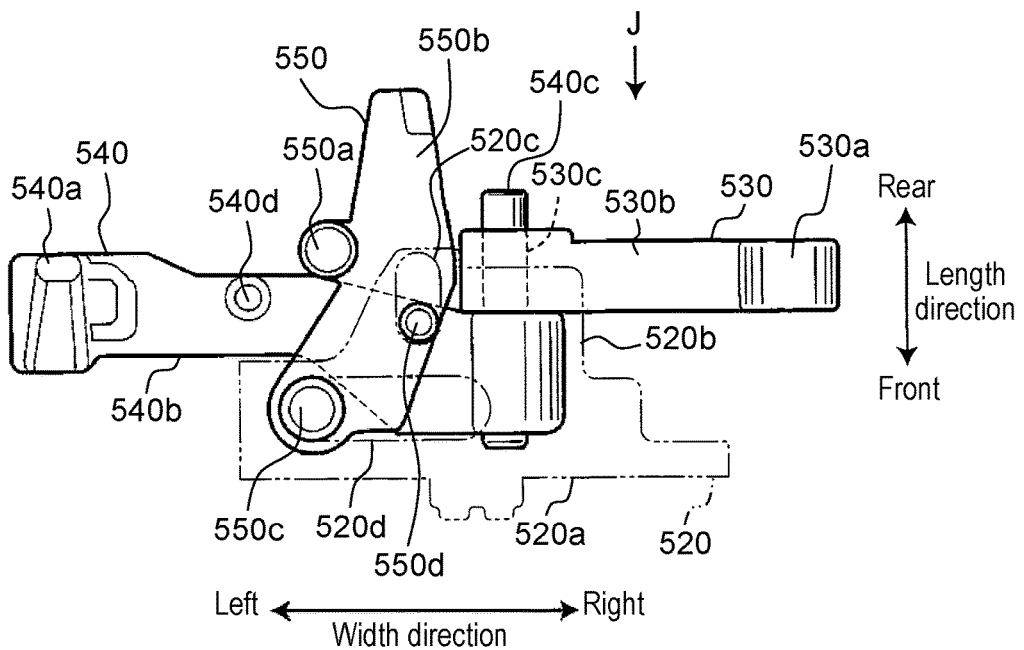
FIG. 14A is a plan view of configuration parts (the case is not illustrated) of the lid opening and closing mechanism in the first state on the housing body side.
Figure 14B:
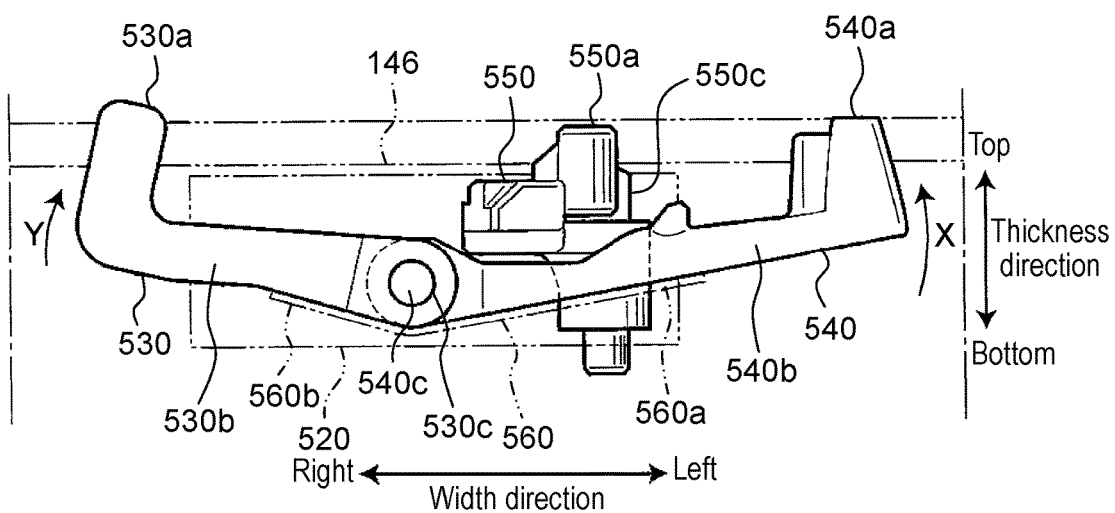
FIG. 14B is a side view of configuration parts (the case is removed) of the lid opening and closing mechanism on the housing body side as viewed from a direction of arrow J in FIG. 14A.

FIG. 14A is a plan view of configuration parts (case 510 is not illustrated) of the opening and closing mechanism of lid 120 in the first state on housing body 110 side. FIG. 14B is a side view of configuration parts (case 510 is removed) of the opening and closing mechanism of lid 120 on housing body 110 side as viewed from a direction of arrow J in FIG. 14A. FIGS. 14A and 14B illustrate a state where lid 120 is not attached to housing body 110.

When operating member 520 is in the first state of being in the first position on the right in the width direction of electronic device 100, the longer direction of movable member 550 is almost parallel to the length direction of electronic device 100, so that movable member 550 is in contact with the vicinity of the base end of lock member 540. Lock member 540 is lifted upward in the thickness direction as indicated by arrow X on the free end side by first urging section 560a of plate spring 560, so that projection 540a projects upward from upper surface 146 of frame 140. Urging member 530 is lifted upward in the thickness direction as indicated by arrow Y on the free end side by second urging section 560b of plate spring 560, so that projection 530a projects upward from upper surface 146 of frame 140.

Figure 15A:
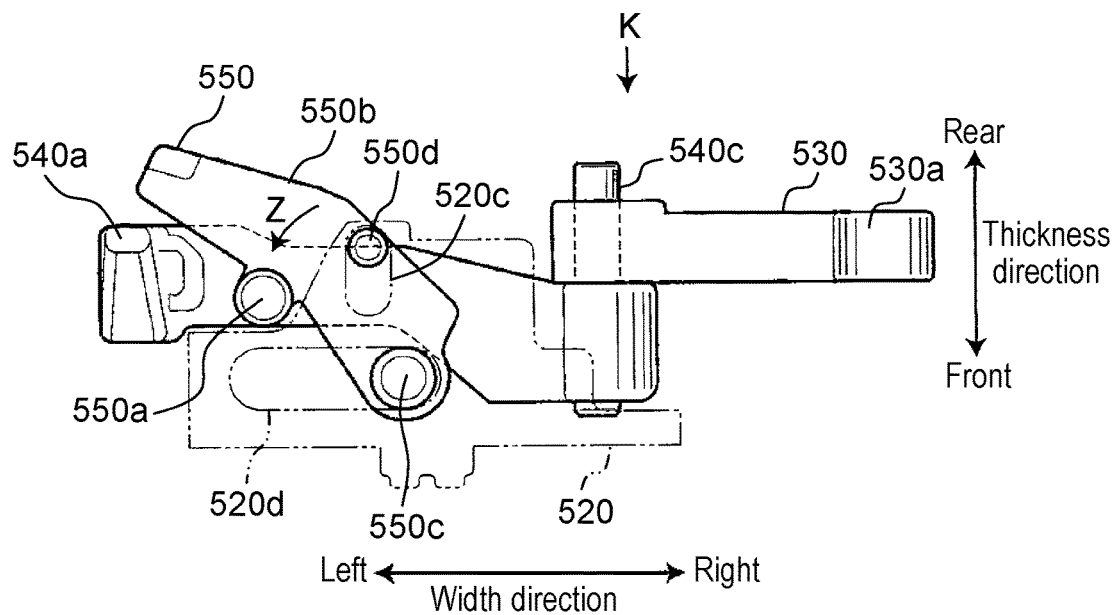
FIG. 15A is a plan view of configuration parts (the case is not illustrated) of the lid opening and closing mechanism in a second state on the housing body side.
Figure 15B:
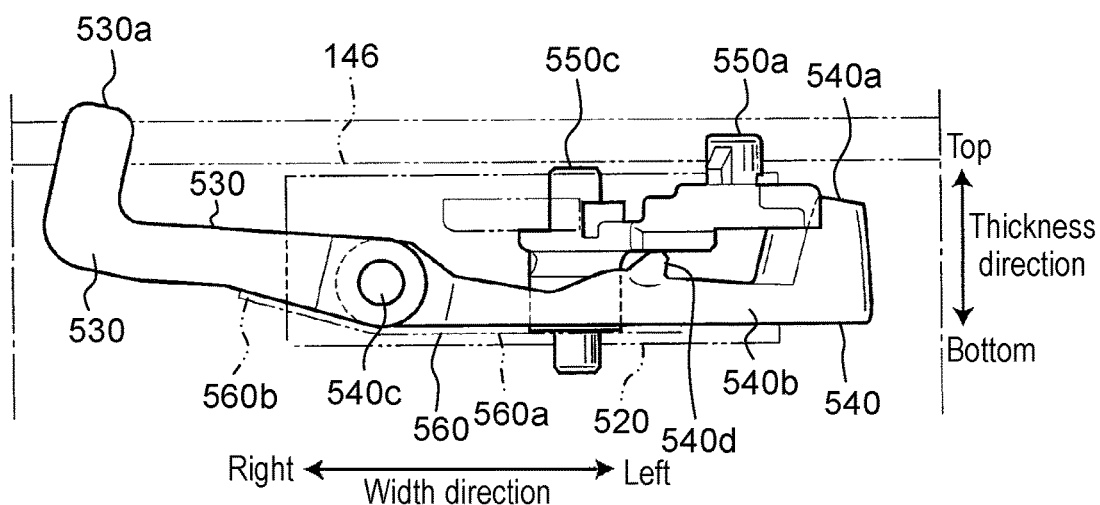
FIG. 15B is a side view of configuration parts (the case is not illustrated) of the lid opening and closing mechanism on the housing body side as viewed from a direction of arrow K in FIG. 15A.
Figure 16:
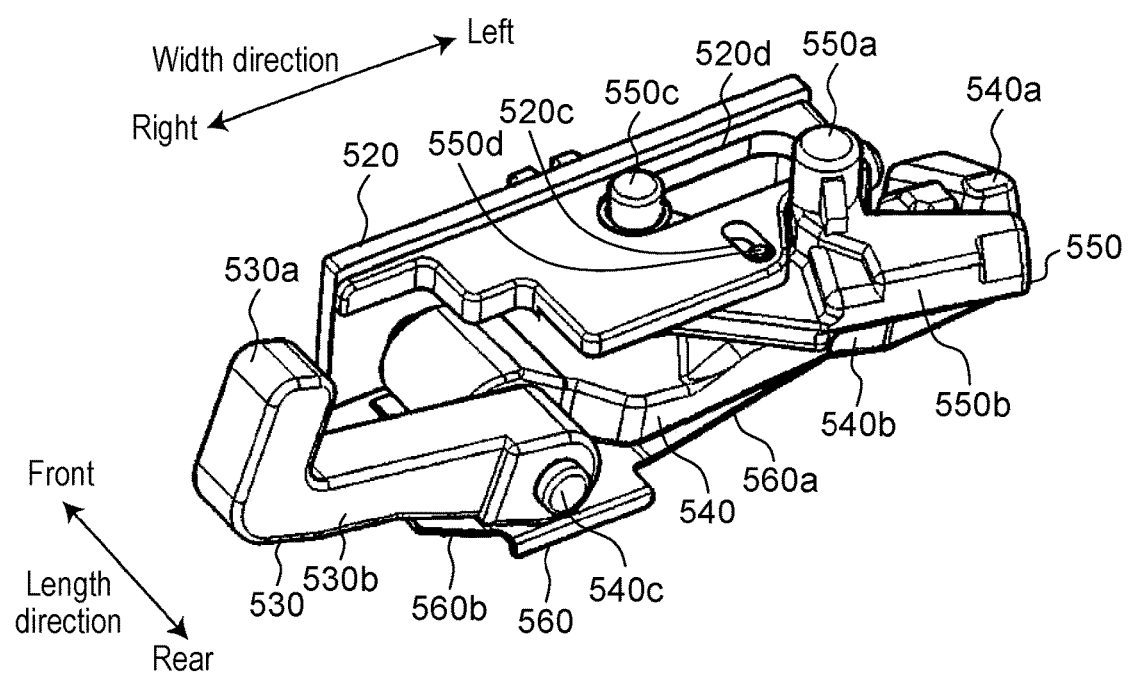
FIG. 16 is a view, as viewed from the direction of arrow K in FIG. 15A, illustrating configuration parts (the case is not illustrated) of the lid opening and closing mechanism in the second state on the housing body side.

FIG. 15A is a plan view of configuration parts (case 510 is not illustrated) of the opening and closing mechanism of lid 120 in the second state on housing body 110 side. FIG. 15B is a side view of configuration parts (case 510 is not illustrated) of the opening and closing mechanism of lid 120 on housing body 110 side as viewed from a direction of arrow K in FIG. 15A. FIGS. 15A and 15B illustrate a state where lid 120 is not attached to housing body 110. FIG. 16 is a view, as viewed from a direction of arrow K in FIG. 15A, illustrating configuration parts (case 510 is not illustrated) of the opening and closing mechanism of lid 120 in the second state on housing body 110 side. The second state indicates a state of the opening and closing mechanism when operating member 520 is in the second position on the left in the width direction of electronic device 100 and lid 120 is not attached.

When a user slides operating member 520 which is in the first state to the second position on the left in the width direction of electronic device 100, the opening and closing mechanism is brought into the second state. Specifically, in the second state, movable member 550 rotates to the left in the width direction of electronic device 100 about rotation shaft 550c as indicated by arrow Z, because engaging shaft 550d of lock member 540 is engaged with first through-hole 520c of operating member 520. In this case, movable member 550 rides over intermediate projection 540d of lock member 540. Thus, lock member 540 is pushed downward in the thickness direction on the free end side against urging force of first urging section 560a of plate spring 560, so that projection 540a is pushed downward from upper surface 146 of frame 140. As in the first state, urging member 530 is lifted upward in the thickness direction on the free end side by second urging section 560b of plate spring 560, so that projection 530a projects upward from upper surface 146 of frame 140. In addition, at this time, projection 550a of movable member 550 rotates about rotation shaft 550c to move frontward in the length direction.

[1-3. Opening and Closing Operation of Lid Opening and Closing Mechanism]

Figure 17A:
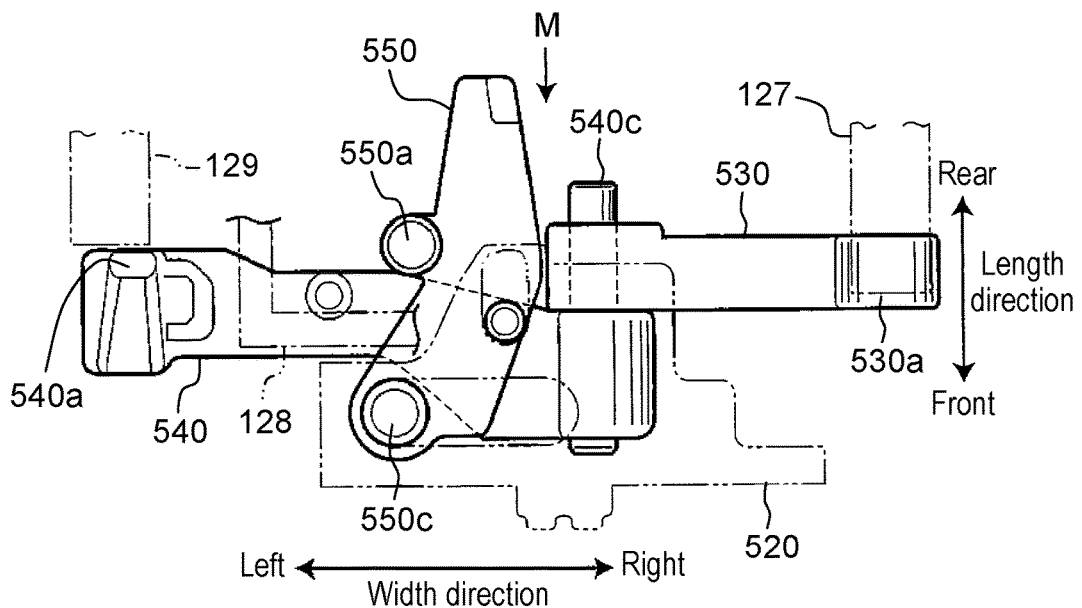
FIG. 17A is a plan view of configuration parts (the case is not illustrated) of the lid opening and closing mechanism in a third state on the housing body side.
Figure 17B:
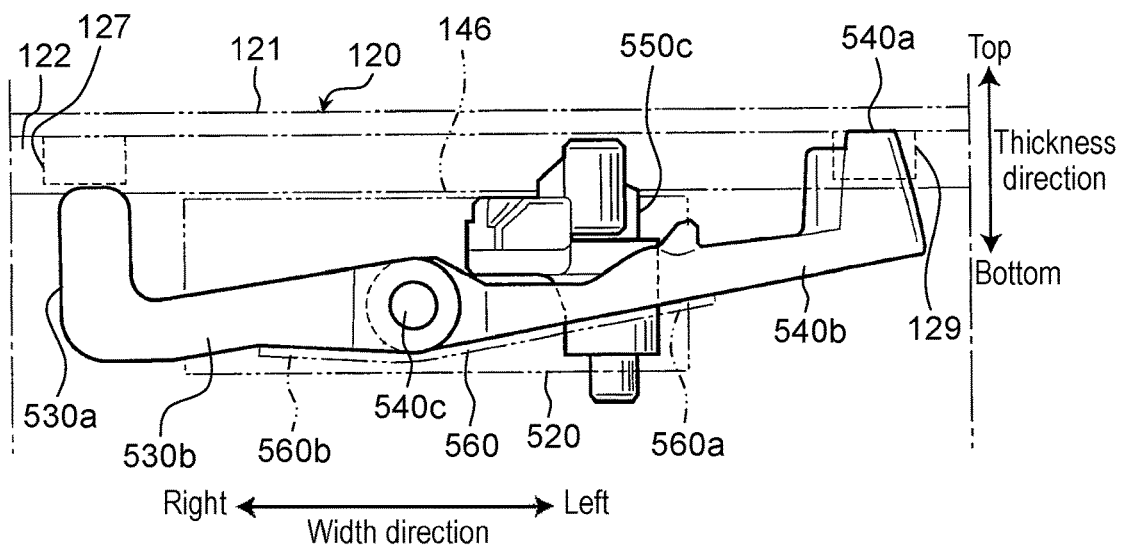
FIG. 17B is a side view of configuration parts (the case is not illustrated) of the lid opening and closing mechanism on the housing body side as viewed from a direction of arrow M in FIG. 17A.
Figure 18A:
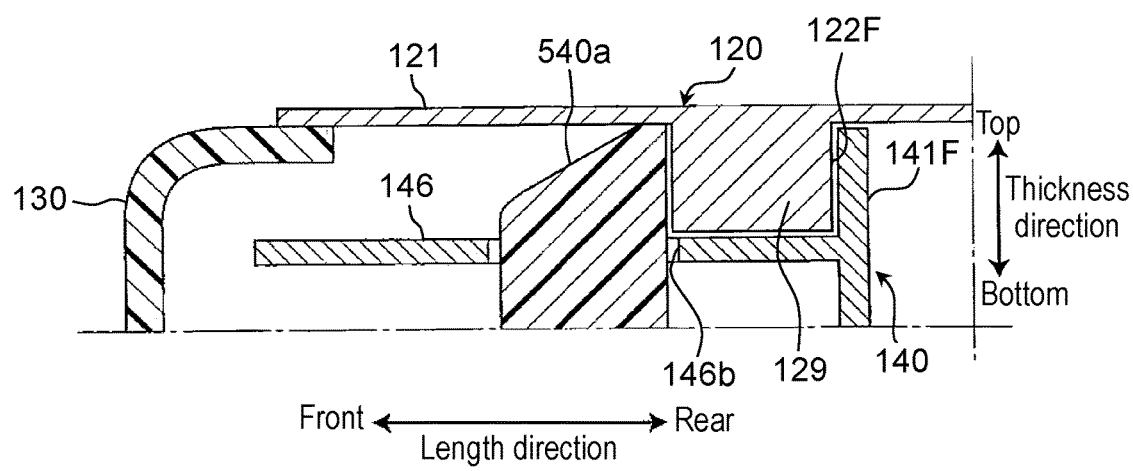
FIG. 18A is a sectional view taken along line 18-18 in FIG. 9 for describing an operation of a lock member.
Figure 18B:
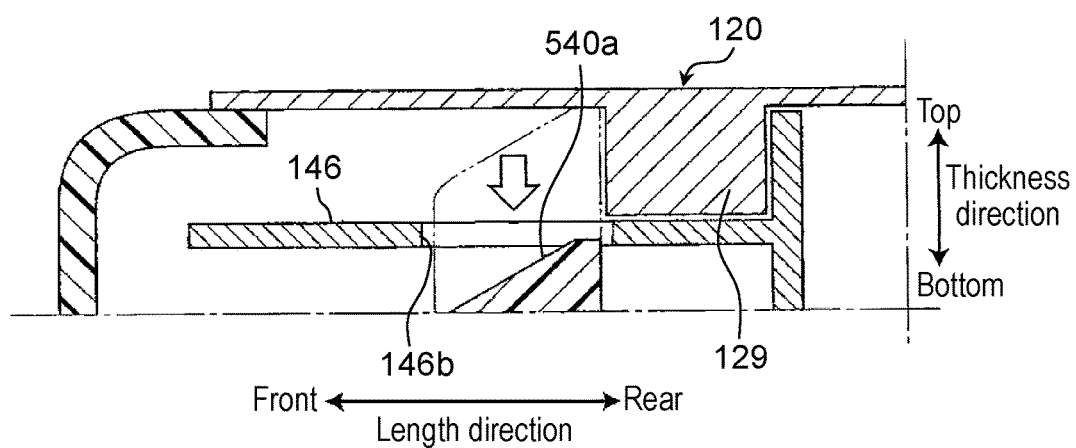
FIG. 18B is a sectional view taken along line 18-18 in FIG. 9 for describing an operation of the lock member.
Figure 20A:
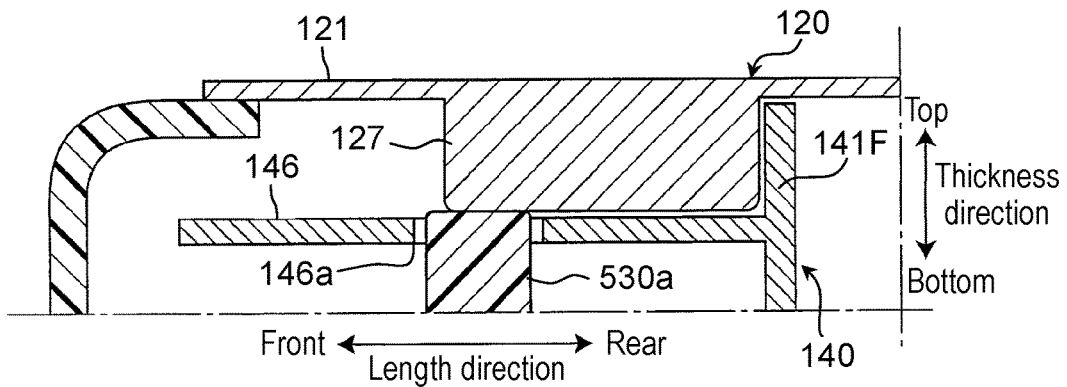
FIG. 20A is a sectional view taken along line 20-20 in FIG. 9 for describing an operation of an urging member.
Figure 20B:
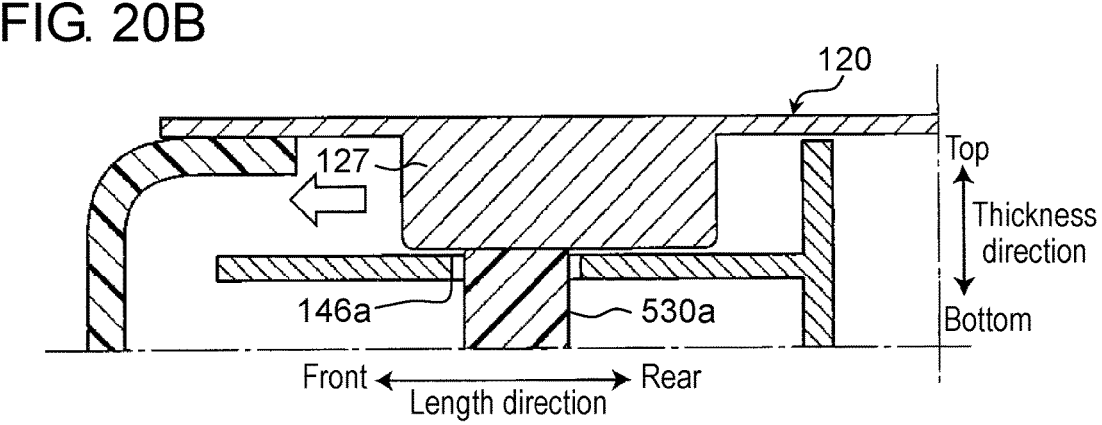
FIG. 20B is a sectional view taken along line 20-20 in FIG. 9 for describing an operation of the urging member.
Figure 20C:
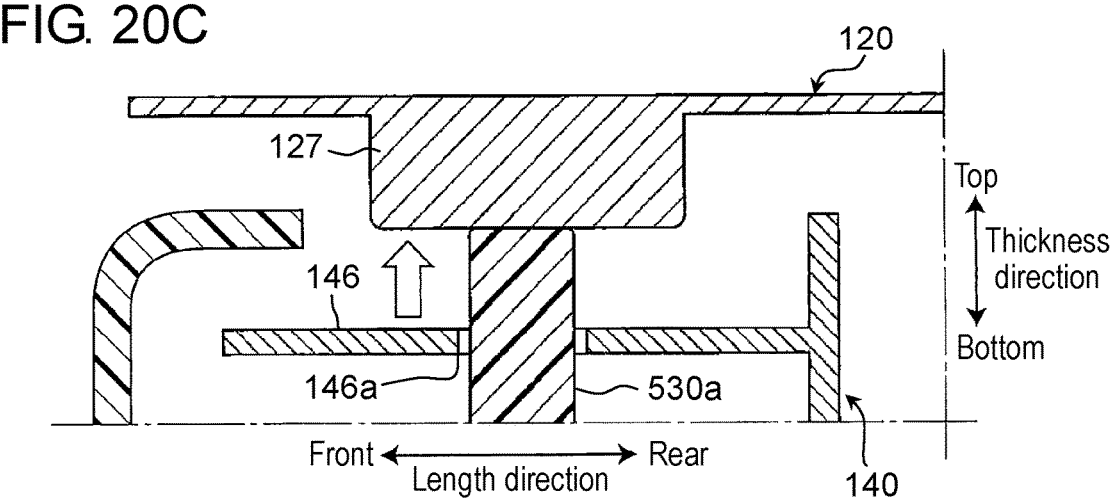
FIG. 20C is a sectional view taken along line 20-20 in FIG. 9 for describing an operation of the urging member.
Figure 21A:
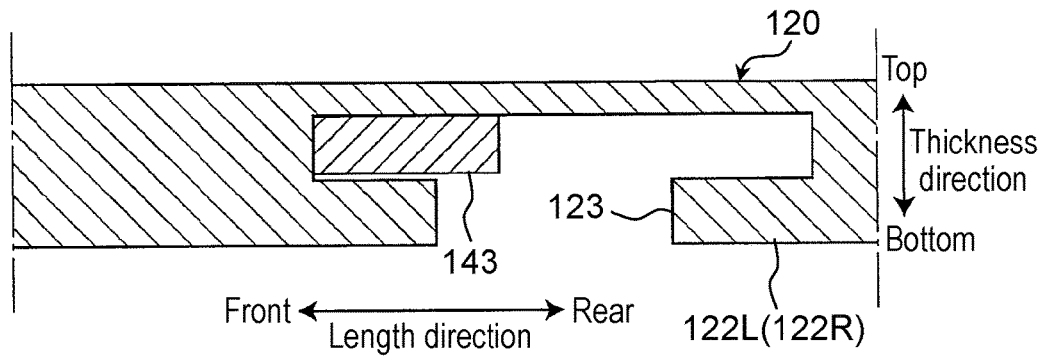
FIG. 21A is a sectional view taken along line 21-21 in FIG. 9 for describing an operation for releasing an engagement between a side protrusion on the housing body and a side recess on the lid.
Figure 21B:
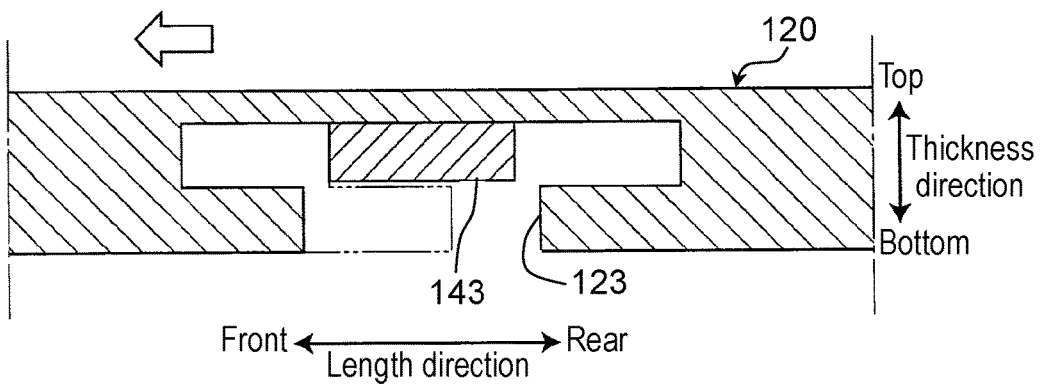
FIG. 21B is a sectional view taken along line 21-21 in FIG. 9 for describing an operation for releasing the engagement between the side protrusion on the housing body and the side recess on the lid.
Figure 21C:
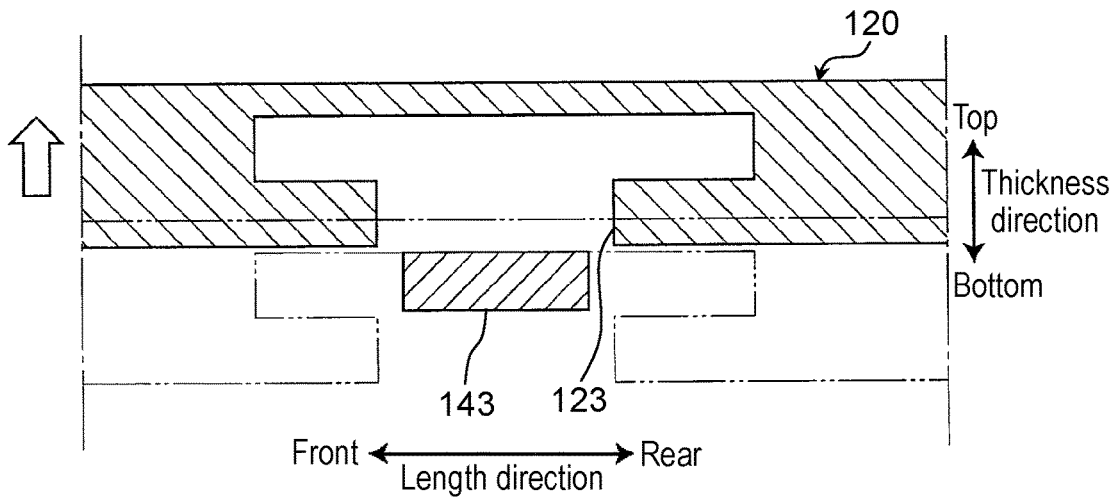
FIG. 21C is a sectional view taken along line 21-21 in FIG. 9 for describing an operation for releasing the engagement between the side protrusion on the housing body and the side recess on the lid.
Figure 22A:
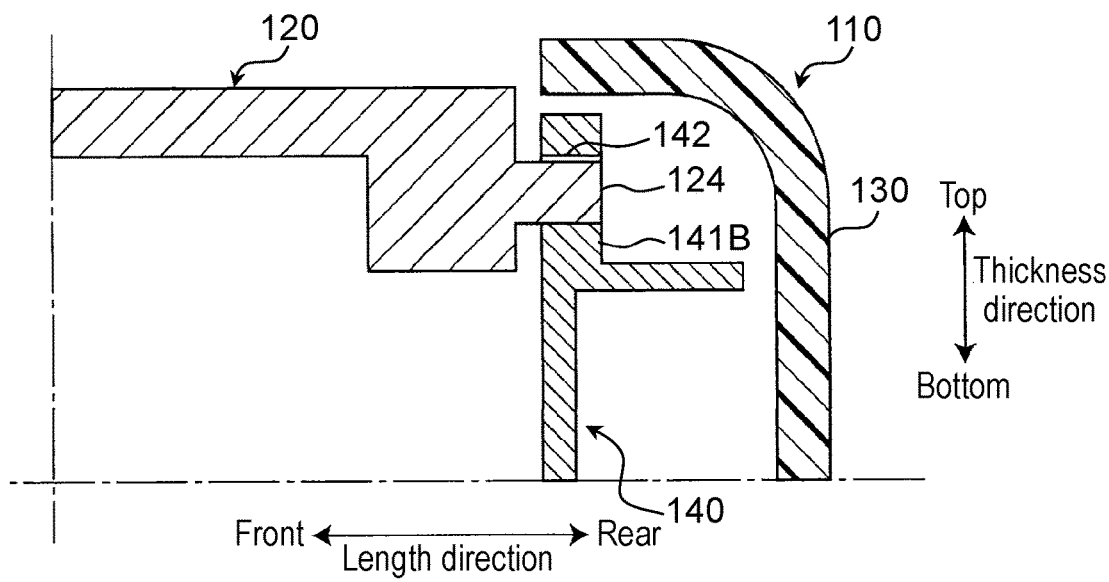
FIG. 22A is a sectional view taken along line 22-22 in FIG. 9 for describing an operation for releasing an engagement between a rear recess on the housing body and a rear protrusion on the lid.
Figure 22B:
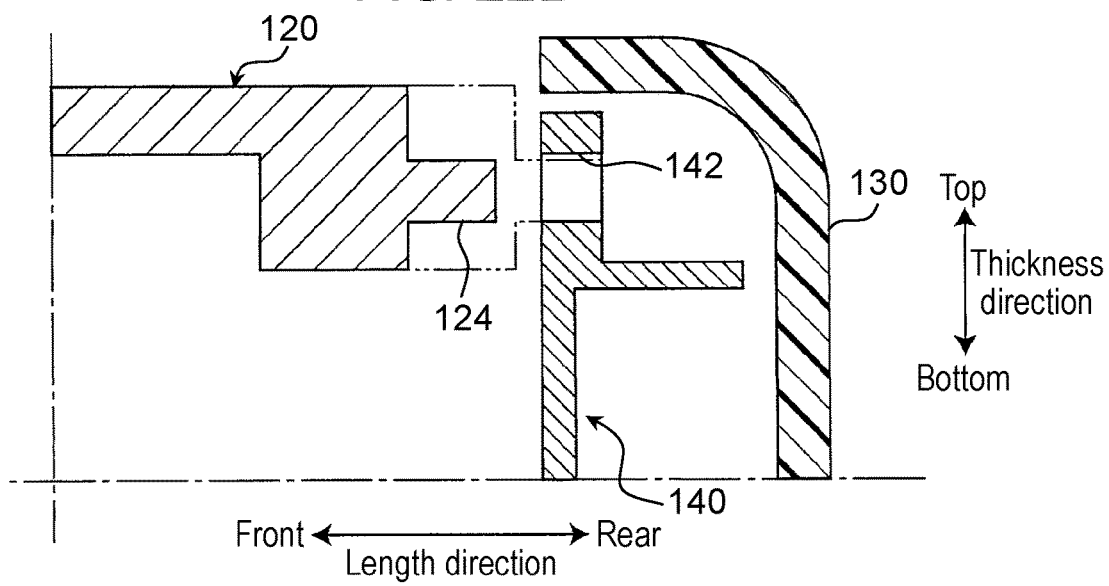
FIG. 22B is a sectional view taken along line 22-22 in FIG. 9 for describing an operation for releasing the engagement between the rear recess on the housing body and the rear protrusion on the lid.
Figure 23A:
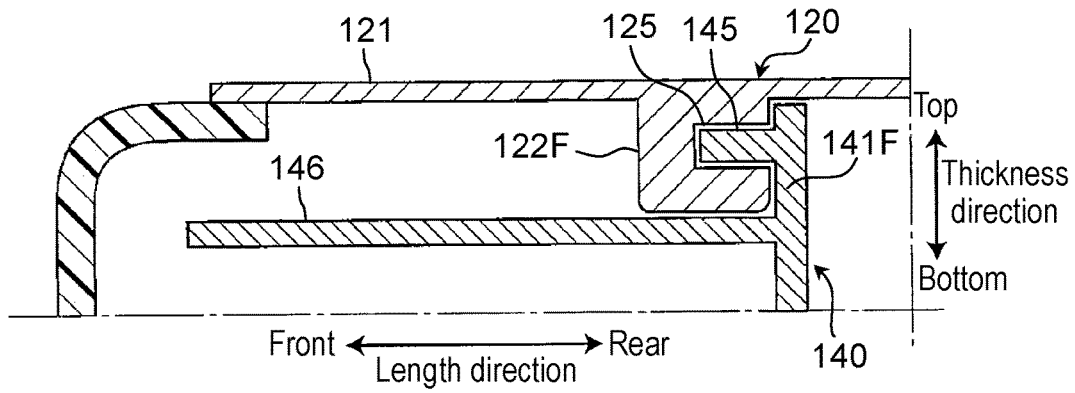
FIG. 23A is a sectional view taken along line 23-23 in FIG. 9 for describing an operation for releasing an engagement between a front protrusion on the housing body and a front recess on the lid.
Figure 23B:
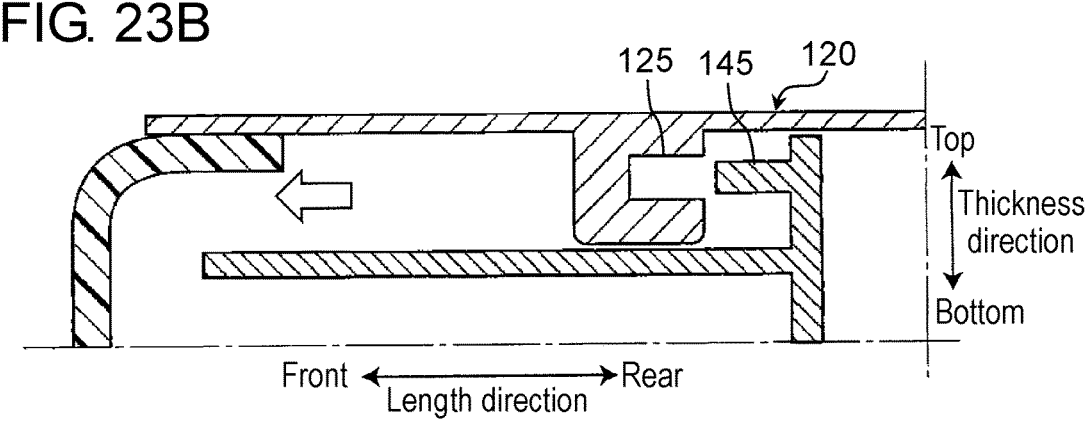
FIG. 23B is a sectional view taken along line 23-23 in FIG. 9 for describing an operation for releasing the engagement between the front protrusion on the housing body and the front recess on the lid.
Figure 23C:
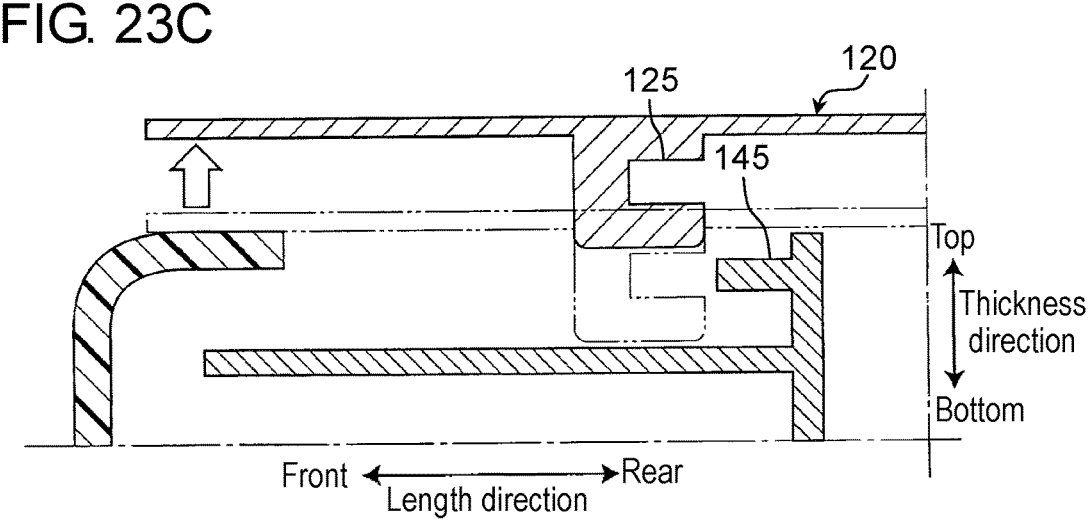
FIG. 23C is a sectional view taken along line 23-23 in FIG. 9 for describing an operation for releasing the engagement between the front protrusion on the housing body and the front recess on the lid.

An opening and closing operation by the opening and closing mechanism of lid 120 will be described with reference to FIGS. 17A to 23C. FIG. 17A is a plan view of configuration parts (case 510 is not illustrated) of the opening and closing mechanism of lid 120 in a third state on housing body 110 side. FIG. 17B is a side view of configuration parts (case 510 is not illustrated) of the opening and closing mechanism of lid 120 on housing body 110 side as viewed from a direction of arrow M in FIG. 17A. The third state indicates a state of the opening and closing mechanism when operating member 520 is in the first position on the right in the width direction of electronic device 100 and lid 120 is attached. FIGS. 18A and 18B are sectional views taken along line 18-18 in FIG. 9 for describing the operation of lock member 540. FIGS. 19A to 19D are sectional views taken along line 19-19 in FIG. 9 for describing the operation of movable member 550. FIGS. 20A to 20C are sectional views taken along line 20-20 in FIG. 9 for describing the operation of urging member 530. FIGS. 21A to 21C are sectional views taken along line 21-21 in FIG. 9 for describing an operation for releasing an engagement between side protrusion 143 on housing body 110 and side recess 123 on lid 120. FIGS. 22A and 22B are sectional views taken along line 22-22 in FIG. 9 for describing an operation for releasing an engagement between rear recess 142 on housing body 110 and rear protrusion 124 on lid 120. FIGS. 23A to 23C are sectional views taken along line 23-23 in FIG. 9 for describing an operation for releasing an engagement between front protrusion 145 on housing body 110 and front recess 125 on lid 120.

As illustrated in FIG. 21A, in the third state, side recess 123 on lid 120 is engaged with the front side of side protrusion 143 on frame 140 of housing body 110. In addition, as illustrated in FIG. 22A, rear protrusion 124 on lid 120 is engaged with rear recess 142 on frame 140 of housing body 110 in the third state. In addition, as illustrated in FIG. 23A, front recess 125 on lid 120 is engaged with front protrusion 145 on frame 140 of housing body 110 in the third state.

As illustrated in FIGS. 17A and 17B, in the third state, lock member 540 and movable member 550 are in the state as in the first state. In addition, as illustrated in FIGS. 17A and 18A, projection 540a of lock member 540 is located on a position adjacent to the front side of first projection 129 of lid 120. Thus, lid 120 is locked in a state of being attached to housing body 110 as being immovable in the frontward direction.

As illustrated in FIGS. 17A, 17B, and 20A, in the third state, urging member 530 is in a state of being pushed down by third projection 127 of lid 120 against the urging force in the upward direction by second urging section 560b of plate spring 560. Therefore, lid 120 is prevented from being lifted up due to various engagements between lid 120 and housing body 110, although upward lifting force is exerted on lid 120.

When operating member 520 is started to be moved toward the second position by the user in this state, projection 540a of lock member 540 is firstly pushed down from upper surface 146 of frame 140 by movable member 550 as illustrated in FIG. 18B. Therefore, the lock on lid 120 relative to housing body 110 is released, so that lid 120 becomes movable in the frontward direction.

Figure 19A:
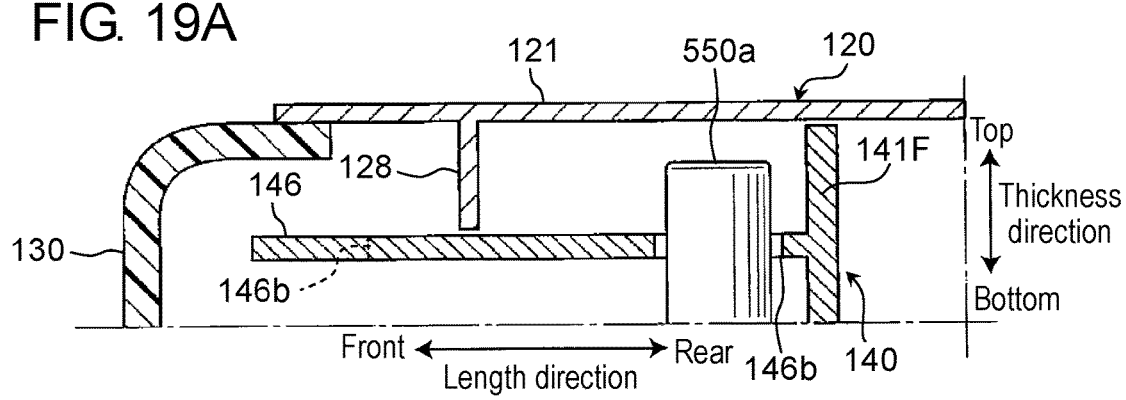
FIG. 19A is a sectional view taken along line 19-19 in FIG. 9 for describing an operation of a movable member.
Figure 19B:
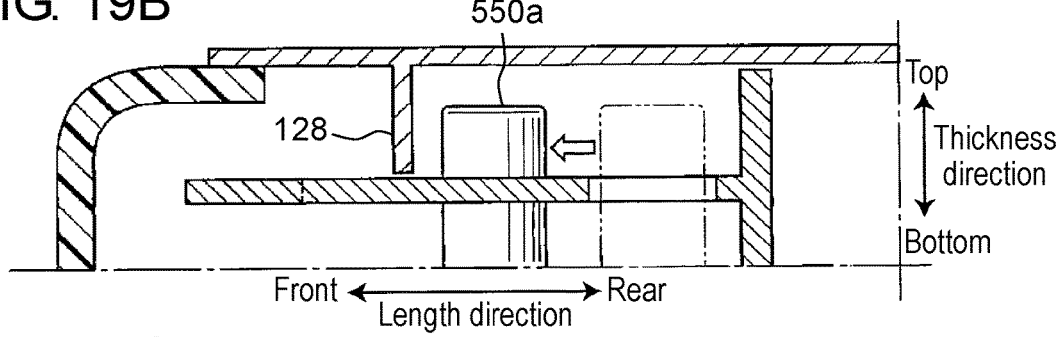
FIG. 19B is a sectional view taken along line 19-19 in FIG. 9 for describing an operation of the movable member.
Figure 19C:
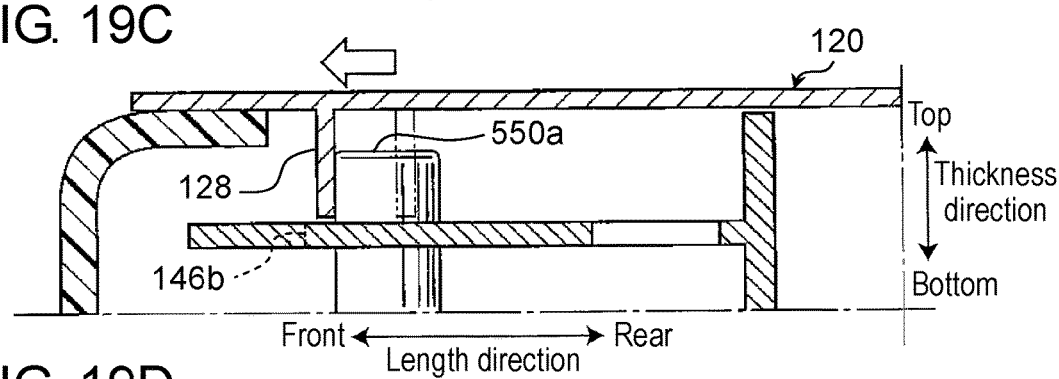
FIG. 19C is a sectional view taken along line 19-19 in FIG. 9 for describing an operation of the movable member.
Figure 19D:
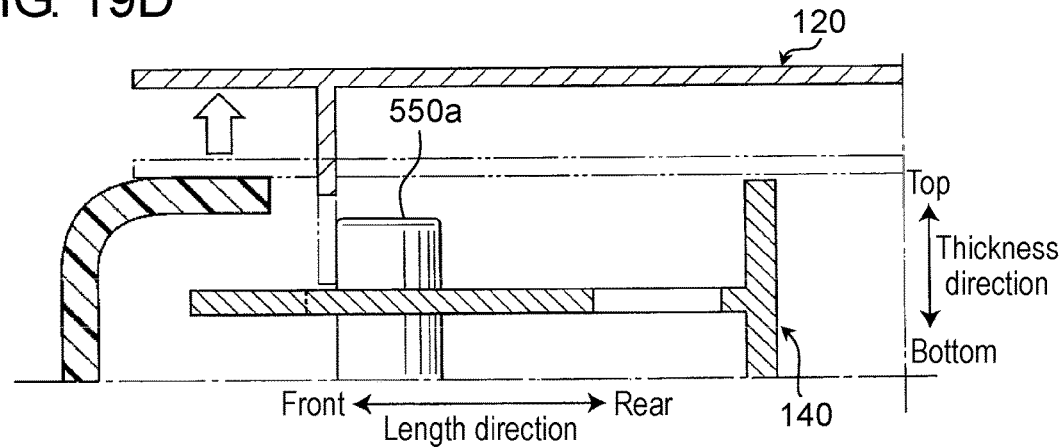
FIG. 19D is a sectional view taken along line 19-19 in FIG. 9 for describing an operation of the movable member.

At this time, projection 550a of movable member 550 is moved frontward to be located near second projection 128 due to the rotation of movable member 550 about rotation shaft 550c as illustrated in FIG. 19B. When operating member 520 is further moved toward the second position from this state, projection 550a of movable member 550 is brought into contact with second projection 128 to move second projection 128 frontward. Thus, lid 120 starts to move frontward. When operating member 520 is further moved toward the second position from this state and the distance of movement of lid 120 in the frontward direction reaches a predetermined distance, the engagement between side recess 123 on lid 120 and side protrusion 143 on frame 140 of housing body 110 is released as illustrated in FIG. 21B. In addition, as illustrated in FIG. 22B, the engagement between rear protrusion 124 on lid 120 and rear recess 142 on frame 140 of housing body 110 is released. In addition, as illustrated in FIG. 23B, the engagement between front recess 125 on lid 120 and front protrusion 145 on frame 140 of housing body 110 is released. That is, the engagements between lid 120 and housing body 110 are all released.

Because lid 120 is urged upward by urging member 530, lid 120 is lifted upward as illustrated in FIGS. 19D, 20C, 21C, and 23C.

As described above, according to the opening and closing mechanism of lid 120 in the present exemplary embodiment, when operating member 520 is moved to the second position relative to housing body 110 with lid 120 being attached to housing body 110, (1) the lock on lid 120 is released, (2) lid 120 is moved in a predetermined direction (frontward direction) by a predetermined distance, and (3) lid 120 is separated from the predetermined face of lid 120 in a direction perpendicular to the predetermined face. Specifically, three (1), (2), and (3) operations are performed by a single operation on operating member 520. Thus, a user can easily remove lid 120 from housing body 110 after performing the operation on operating member 520. Accordingly, usability of opening and closing lid 120 can be enhanced.

[2. Effects and Other Benefits]

The opening and closing mechanism of lid 120 according to the present exemplary embodiment is an opening and closing mechanism of lid 120 of electronic device 100 which includes housing body 110 constituting sections other than a predetermined face of housing 108 for accommodating electronic components, and lid 120 which constitutes a section corresponding to the predetermined face of housing 108 and is detachable to housing body 110.

Lid 120 is configured to be engaged with housing body 110 in a state of being attached to housing body 110, and to release the engagement with housing body 110 when being moved in a predetermined direction parallel to the predetermined face from the state of being attached to housing body 110.

The opening and closing mechanism has operating member 520 which is disposed on housing body 110 so as to be displaceable relative to housing body 110, and drive mechanism 500.

Drive mechanism 500 locks lid 120 so that lid 120 does not move in the predetermined direction when operating member 520 is in a first position relative to housing body 110 in a state where lid 120 is attached to housing body 110.

When operating member 520 is moved to a second position relative to housing body 110 with lid 120 being attached to housing body 110, drive mechanism 500: (1) releases the lock on lid 120; (2) moves lid 120 in the predetermined direction by at least a predetermined distance; and (3) separates lid 120 from the predetermined face in a direction perpendicular to the predetermined face.

Thus, when operating member 520 is moved to the second position relative to housing body 110 with lid 120 being attached to housing body 110, (1) the lock on lid 120 is released, (2) lid 120 is moved in the predetermined direction by a predetermined distance; and (3) lid 120 is separated from the predetermined face in a direction perpendicular to the predetermined face. Specifically, three (1), (2), and (3) operations are performed by a single operation on operating member 520. Thus, a user can easily remove lid 120 from housing body 110 after performing the operation on operating member 520. Accordingly, usability of opening and closing lid 120 can be enhanced.

In the present exemplary embodiment, drive mechanism 500 has first projection 129 formed on a lower surface (inner surface) of lid 120 so as to project toward housing body 110, and lock member 540 disposed on housing body 110, wherein drive mechanism 500: locks lid 120 so that lid 120 does not move in a predetermined direction by positioning lock member 540 to be adjacent to first projection 129 on the predetermined direction side of first projection 129, when operating member 520 is in the first position with lid 120 being attached to housing body 110; and releases the lock on lid 120 by moving lock member 540 to a position not adjacent to first projection 129 on the predetermined direction side of first projection 129, when operating member 520 is moved to a second position relative to housing body 110 with lid 120 being attached to housing body 110.

Thus, a mechanism for releasing a lock on lid 120 can be implemented by a simple configuration.

In the present exemplary embodiment, drive mechanism 500 has second projection 128 formed on a lower surface (inner surface) of lid 120 so as to project toward housing body 110, and movable member 550 disposed on housing body 110, wherein drive mechanism 500: locates movable member 550 to be separated from second projection 128 in a direction opposite to the predetermined direction when operating member 520 is in the first position with lid 120 being attached to housing body 110; moves movable member 550 in the predetermined direction to be in contact with second projection 128 while operating member 520 is moved to the second position; and further moves movable member 550 in the predetermined direction as being in contact with second projection 128 to move lid 120 in the predetermined direction by at least the predetermined distance.

Thus, a mechanism for moving lid 120 in the predetermined direction by at least a predetermined distance can be implemented by a simple configuration.

In the present exemplary embodiment, drive mechanism 500 has an urging mechanism disposed on housing body 110 for urging lid 120 to be separated from the predetermined face of housing 108.

Thus, a mechanism for separating lid 120 from the predetermined face in a direction perpendicular to the predetermined face can be implemented by a simple configuration.

Electronic device 100 according to the present exemplary embodiment includes housing body 110 constituting sections other than a predetermined face of housing 108 for accommodating electronic components, lid 120 which constitutes a section corresponding to the predetermined face of housing 108 and is detachable to housing body 110, and an opening and closing mechanism of lid 120.

Thus, usability for a user when opening and closing lid 120 of electronic device 100 is enhanced.

Another Exemplary Embodiment

The first exemplary embodiment has been described above and exemplified as the technology of the present disclosure. However, the technology of the present disclosure is not limited to the above described exemplary embodiment, but is applicable to another exemplary embodiment where modifications, replacements, additions, or omissions have been made appropriately.

Another exemplary embodiment will be described below.

In the first exemplary embodiment, lock member 540 and urging member 530 are urged upward (toward lid 120) by plate spring 560. However, lock member 540 and urging member 530 may be urged upward (toward lid 120) by a coil spring instead of plate spring 560. In addition, operating member 520 which is urged toward the first position by coil spring 570 may be urged by a plate spring instead of coil spring 570.

In the first exemplary embodiment, drive mechanism 500 includes lock member 540, urging member 530, movable member 550, plate spring 560, etc., but it is not limited thereto. In the present disclosure, drive mechanism 500 may have another configuration, so long as, drive mechanism is able to lock lid 120 so that lid 120 does not move in a predetermined direction when operating member 520 is in the first position relative to housing body 110 with lid 120 being attached to housing body 110, and when operating member 520 is moved to the second position relative to housing body 110 with lid 120 being attached to housing body 110, drive mechanism 500 can (1) release the lock on lid 120, (2) move lid 120 in the predetermined direction by at least a predetermined distance, and (3) separate lid 120 from a predetermined face in a direction perpendicular to the predetermined face.

In the first exemplary embodiment, electronic device 100 is a tablet computer. However, it is obvious that the lid opening and closing mechanism in the present disclosure is widely applicable to various electronic devices including: a housing body which constitutes sections other than a predetermined face of a housing for accommodating electronic components; and a lid which constitutes the section corresponding to the predetermined face of the housing and is detachable to the housing body, such as a digital camera, a video camera, a mobile phone, a smartphone, or an electronic game machine.

The exemplary embodiments have been described above and exemplified as the technology of the present disclosure. The accompanying drawings and detailed description have been presented for this purpose.

Accordingly, the components described in the appended drawings and the detailed descriptions include, in order to exemplifying the above described technology, not only essential components, but also components that are not essential. Therefore, it should not immediately be construed that these components that are not essential are essential because the components are described in the appended drawings and the detailed descriptions.

Since the above described exemplary embodiments are for exemplifying the technology of the present disclosure, various modifications, replacements, additions, and omissions can be made to the exemplary embodiments.

The present disclosure is widely applicable to an electronic device which includes a housing body constituting sections other than a predetermined face of a housing for accommodating electronic components, and a lid which constitutes a section corresponding to the predetermined face of the housing and is detachable to the housing body.

What is claimed is:

1. A lid opening and closing mechanism for an electronic device which includes a housing body constituting sections other than a predetermined face of a housing for accommodating electronic components, and a lid which constitutes a section corresponding to the predetermined face of the housing and is detachable to the housing body, the lid being configured to be engaged with the housing body in a state of being attached to the housing body, and to release an engagement with the housing body when being moved in a predetermined direction parallel to the predetermined face by a predetermined distance from the state where the lid is attached to the housing body, the lid opening and closing mechanism comprising:

an operating member which is disposed to the housing body so as to be displaceable relative to the housing body; and a drive mechanism, wherein the drive mechanism:

locks the lid so that the lid does not move in the predetermined direction when the operating member is in a first position relative to the housing body with the lid being attached to the housing body; and releases the lock on the lid, moves the lid in the predetermined direction by at least the predetermined distance, and separates the lid from the predetermined face in a direction perpendicular to the predetermined face, when the operating member is moved to a second position relative to the housing body with the lid being attached to the housing body.

2. The lid opening and closing mechanism according to claim 1, wherein the drive mechanism has:

a first projection formed on an inner surface of the lid so as to project toward the housing body side; and a lock member disposed on the housing body, wherein the drive mechanism:

locks the lid so that the lid does not move in the predetermined direction by locating the lock member to be adjacent to the first projection on a side in the predetermined direction of the first projection, when the operating member is in the first position with the lid being attached to the housing body, and releases the lock on the lid by moving the lock member to a position not adjacent to the first projection on the side in the predetermined direction of the first projection, when the operating member is moved to the second position relative to the housing body with the lid being attached to the housing body.

3. The lid opening and closing mechanism according to claim 1, wherein the drive mechanism has:

a second projection formed on an inner surface of the lid so as to project toward the housing body; and a movable member disposed on the housing body, wherein the drive mechanism:

locates the movable member away from the second projection in a direction opposite to the predetermined direction, when the operating member is in the first position with the lid being attached to the housing body; and moves the movable member in the predetermined direction to be in contact with the second projection, and further moves the movable member in the predetermined direction as being in contact with the second projection to move the lid in the predetermined direction by at least the predetermined distance, while the operating member is moved to the second position.

4. The lid opening and closing mechanism according to claim 1, wherein the drive mechanism has an urging mechanism which is disposed in the housing body for urging the lid in a direction away from the predetermined face of the housing.

5. An electronic device comprising the lid opening and closing mechanism according to claim 1.

* * * * *